(12) United States Patent
Das et al.

(10) Patent No.: US 11,808,669 B2
(45) Date of Patent: Nov. 7, 2023

(54) GAIN AND MISMATCH CALIBRATION FOR A PHASE DETECTOR USED IN AN INDUCTIVE SENSOR

(71) Applicant: Cirrus Logic International Semiconductor Ltd., Edinburgh (GB)

(72) Inventors: Tejasvi Das, Austin, TX (US); Siddharth Maru, Austin, TX (US); John L Melanson, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 120 days.

(21) Appl. No.: 17/215,117

(22) Filed: Mar. 29, 2021

(65) Prior Publication Data

US 2022/0308000 A1 Sep. 29, 2022

(51) Int. Cl.
*H03B 21/00* (2006.01)
*G01N 27/02* (2006.01)

(52) U.S. Cl.
CPC ......... *G01N 27/025* (2013.01); *G01N 27/028* (2013.01)

(58) Field of Classification Search
CPC ............................ G01N 27/028; G01N 27/025
See application file for complete search history.

(56) References Cited

U.S. PATENT DOCUMENTS

| | | | |
|---|---|---|---|
| 4,268,822 A | 5/1981 | Olsen | |
| 4,888,554 A | 12/1989 | Hyde et al. | |
| 5,286,941 A | 2/1994 | Bel | |
| 5,361,184 A | 11/1994 | El-Sharkawi et al. | |
| 5,567,920 A | 10/1996 | Watanabe et al. | |
| 5,661,269 A | 8/1997 | Fukuzaki et al. | |
| 5,715,529 A * | 2/1998 | Kianush | H04B 1/26 455/340 |
| 5,898,136 A | 4/1999 | Katsurahira | |
| 6,231,520 B1 | 5/2001 | Maezawa | |

(Continued)

FOREIGN PATENT DOCUMENTS

| | | |
|---|---|---|
| CN | 10542884 A | 3/2016 |
| CN | 106471708 A | 3/2017 |

(Continued)

OTHER PUBLICATIONS

International Search Report and Written Opinion of the International Searching Authority, International Application No. PCT/US2019/045554, dated Oct. 17, 2019.

(Continued)

*Primary Examiner* — Alesa Allgood
(74) *Attorney, Agent, or Firm* — Jackson Walker L.L.P

(57) ABSTRACT

A system may include a resonant sensor configured to sense a physical quantity, a measurement circuit communicatively coupled to the resonant sensor and configured to measure one or more resonance parameters associated with the resonant sensor and indicative of the physical quantity using an incident/quadrature detector having an incident channel and a quadrature channel and perform a calibration of a non-ideality between the incident channel and the quadrature channel of the system, the calibration comprising determining the non-ideality by controlling the sensor signal, an oscillation signal for the incident channel, and an oscillation signal for the quadrature channel; and correcting for the non-ideality.

34 Claims, 12 Drawing Sheets

(56) References Cited

U.S. PATENT DOCUMENTS

| | | |
|---|---|---|
| 6,283,859 B1 | 9/2001 | Carlson et al. |
| 6,380,923 B1 | 4/2002 | Fukumoto et al. |
| 6,473,708 B1 | 10/2002 | Watkins et al. |
| 7,173,410 B1 | 2/2007 | Pond |
| 7,965,276 B1 | 6/2011 | Martin et al. |
| 8,144,126 B2 | 3/2012 | Wright |
| 8,174,352 B2 | 5/2012 | Parpia et al. |
| 8,346,487 B2 | 1/2013 | Wright et al. |
| 8,384,378 B2 | 2/2013 | Feldkamp et al. |
| 8,421,446 B2 | 4/2013 | Straubinger et al. |
| 8,428,889 B2 | 4/2013 | Wright |
| 8,457,915 B2 | 6/2013 | White et al. |
| 8,674,950 B2 | 3/2014 | Olson |
| 8,970,230 B2 | 3/2015 | Narayanasamy et al. |
| 9,070,856 B1 | 6/2015 | Rose et al. |
| 9,164,605 B1 | 10/2015 | Pirogov et al. |
| 9,707,502 B1 | 7/2017 | Bonifas et al. |
| 10,168,855 B2 | 1/2019 | Baughman et al. |
| 10,372,328 B2 | 8/2019 | Zhai |
| 10,571,307 B2 | 2/2020 | Acker |
| 10,599,247 B2 | 3/2020 | Winokur et al. |
| 10,624,691 B2 | 4/2020 | Wiender et al. |
| 10,642,435 B2 | 5/2020 | Maru et al. |
| 10,725,549 B2 | 7/2020 | Marijanovic et al. |
| 10,726,715 B2 | 7/2020 | Hwang et al. |
| 10,795,518 B2 | 10/2020 | Kuan et al. |
| 10,866,677 B2 | 12/2020 | Haraikawa |
| 10,908,200 B2 | 2/2021 | You et al. |
| 10,921,159 B1 | 2/2021 | Das et al. |
| 10,935,620 B2 | 3/2021 | Das et al. |
| 10,942,610 B2 | 3/2021 | Maru et al. |
| 10,948,313 B2 | 3/2021 | Kost et al. |
| 11,079,874 B2 | 8/2021 | Lapointe et al. |
| 11,092,657 B2 | 8/2021 | Maru et al. |
| 11,204,670 B2 | 12/2021 | Maru et al. |
| 11,294,503 B2 | 4/2022 | Westerman |
| 11,507,199 B2 | 11/2022 | Melanson |
| 11,537,242 B2 | 12/2022 | Das et al. |
| 11,579,030 B2 | 2/2023 | Li et al. |
| 2001/0045941 A1 | 11/2001 | Rosenberg et al. |
| 2003/0038624 A1 | 2/2003 | Hilliard et al. |
| 2005/0192727 A1 | 9/2005 | Shostak et al. |
| 2005/0258826 A1 | 11/2005 | Kano et al. |
| 2005/0283330 A1 | 12/2005 | Laraia et al. |
| 2006/0025897 A1 | 2/2006 | Shostak et al. |
| 2006/0293864 A1 | 12/2006 | Soss |
| 2007/0047634 A1 | 3/2007 | Kang et al. |
| 2007/0080680 A1 | 4/2007 | Schroeder et al. |
| 2007/0198926 A1 | 8/2007 | Joguet et al. |
| 2007/0268265 A1 | 11/2007 | XiaoPing |
| 2007/0296593 A1 | 12/2007 | Hall et al. |
| 2007/0296709 A1 | 12/2007 | GuangHai |
| 2008/0007534 A1 | 1/2008 | Peng et al. |
| 2008/0024456 A1 | 1/2008 | Peng et al. |
| 2008/0088594 A1 | 4/2008 | Liu et al. |
| 2008/0088595 A1 | 4/2008 | Liu et al. |
| 2008/0142352 A1 | 6/2008 | Wright |
| 2008/0143681 A1 | 6/2008 | XiaoPing |
| 2008/0150905 A1 | 6/2008 | Grivna et al. |
| 2008/0158185 A1 | 7/2008 | Westerman |
| 2009/0008161 A1 | 1/2009 | Jones et al. |
| 2009/0058430 A1 | 3/2009 | Zhu |
| 2009/0140728 A1 | 6/2009 | Rollins et al. |
| 2009/0251216 A1 | 10/2009 | Giotta et al. |
| 2009/0278685 A1 | 11/2009 | Potyrailo et al. |
| 2009/0302868 A1 | 12/2009 | Feucht et al. |
| 2009/0308155 A1 | 12/2009 | Zhang |
| 2010/0019777 A1 | 1/2010 | Balslink |
| 2010/0045360 A1 | 2/2010 | Howard et al. |
| 2010/0114505 A1 | 5/2010 | Wang et al. |
| 2010/0153845 A1 | 6/2010 | Gregorio et al. |
| 2010/0211902 A1 | 8/2010 | Unsworth et al. |
| 2010/0231239 A1 | 9/2010 | Tateishi et al. |
| 2010/0238121 A1 | 9/2010 | Ely |
| 2010/0328249 A1 | 12/2010 | Ningrat et al. |
| 2011/0005090 A1 | 1/2011 | Lee et al. |
| 2011/0214481 A1 | 9/2011 | Kachanov et al. |
| 2011/0216311 A1 | 9/2011 | Kachanov et al. |
| 2011/0267302 A1 | 11/2011 | Fasshauer |
| 2011/0285667 A1 | 11/2011 | Poupyrev et al. |
| 2011/0291821 A1 | 12/2011 | Chung |
| 2011/0301876 A1 | 12/2011 | Yamashita |
| 2013/0018489 A1 | 1/2013 | Grunthaner et al. |
| 2013/0076374 A1 | 3/2013 | Huang |
| 2013/0106756 A1 | 5/2013 | Kono et al. |
| 2013/0106769 A1 | 5/2013 | Bakken et al. |
| 2013/0269446 A1 | 10/2013 | Fukushima et al. |
| 2014/0002113 A1 | 1/2014 | Schediwy et al. |
| 2014/0028327 A1 | 1/2014 | Potyrailo et al. |
| 2014/0137585 A1 | 5/2014 | Lu et al. |
| 2014/0225599 A1 | 8/2014 | Hess |
| 2014/0253107 A1 | 9/2014 | Roach et al. |
| 2014/0267065 A1 | 9/2014 | Levesque |
| 2014/0278173 A1 | 9/2014 | Elia et al. |
| 2015/0022174 A1 | 1/2015 | Nikitin |
| 2015/0027139 A1 | 1/2015 | Lin et al. |
| 2015/0077094 A1 | 3/2015 | Baldwin et al. |
| 2015/0084874 A1 | 3/2015 | Cheng et al. |
| 2015/0293695 A1 | 10/2015 | Schonleben et al. |
| 2015/0329199 A1 | 11/2015 | Golborne et al. |
| 2015/0355043 A1 | 12/2015 | Steeneken et al. |
| 2016/0018940 A1 | 1/2016 | Lo et al. |
| 2016/0048256 A1 | 2/2016 | Day |
| 2016/0117084 A1 | 4/2016 | Ording |
| 2016/0162031 A1 | 6/2016 | Westerman et al. |
| 2016/0169717 A1 | 6/2016 | Zhitomirsky |
| 2016/0179243 A1 | 6/2016 | Schwartz |
| 2016/0231860 A1 | 8/2016 | Elia |
| 2016/0231874 A1 | 8/2016 | Baughman et al. |
| 2016/0241227 A1 | 8/2016 | Hirata |
| 2016/0252403 A1 | 9/2016 | Murakami |
| 2016/0357296 A1 | 12/2016 | Picciotto et al. |
| 2017/0077735 A1 | 3/2017 | Leabman |
| 2017/0093222 A1 | 3/2017 | Joye et al. |
| 2017/0097437 A1 | 4/2017 | Widmer et al. |
| 2017/0140644 A1 | 5/2017 | Hwang et al. |
| 2017/0147068 A1 | 5/2017 | Yamazaki et al. |
| 2017/0168578 A1 | 6/2017 | Tsukamoto et al. |
| 2017/0169674 A1 | 6/2017 | Macours |
| 2017/0184416 A1 | 6/2017 | Kohlenberg et al. |
| 2017/0185173 A1 | 6/2017 | Ito et al. |
| 2017/0187541 A1 | 6/2017 | Sundaresan et al. |
| 2017/0237293 A1 | 8/2017 | Faraone et al. |
| 2017/0242505 A1 | 8/2017 | Vandermeijden et al. |
| 2017/0282715 A1 | 10/2017 | Fung et al. |
| 2017/0322643 A1 | 11/2017 | Eguchi |
| 2017/0328740 A1 | 11/2017 | Widmer et al. |
| 2017/0371380 A1 | 12/2017 | Oberhauser et al. |
| 2017/0371381 A1 | 12/2017 | Liu |
| 2017/0371473 A1 | 12/2017 | David et al. |
| 2018/0019722 A1 | 1/2018 | Birkbeck |
| 2018/0020288 A1 | 1/2018 | Risbo et al. |
| 2018/0055448 A1 | 3/2018 | Karakaya et al. |
| 2018/0059793 A1 | 3/2018 | Hajati |
| 2018/0067601 A1 | 3/2018 | Winokur et al. |
| 2018/0088064 A1 | 3/2018 | Potyrailo et al. |
| 2018/0088702 A1 | 3/2018 | Schutzberg et al. |
| 2018/0097475 A1* | 4/2018 | Djahanshahi ............ H03B 5/12 |
| 2018/0135409 A1 | 5/2018 | Wilson et al. |
| 2018/0182212 A1 | 6/2018 | Li et al. |
| 2018/0183372 A1 | 6/2018 | Li et al. |
| 2018/0189647 A1 | 7/2018 | Calvo et al. |
| 2018/0195881 A1 | 7/2018 | Acker |
| 2018/0221796 A1 | 8/2018 | Bonifas et al. |
| 2018/0229161 A1 | 8/2018 | Maki et al. |
| 2018/0231485 A1 | 8/2018 | Potyrailo et al. |
| 2018/0260049 A1 | 9/2018 | O'Lionaird et al. |
| 2018/0260050 A1 | 9/2018 | Unseld et al. |
| 2018/0321748 A1 | 11/2018 | Rao et al. |
| 2018/0364731 A1 | 12/2018 | Liu et al. |
| 2019/0052045 A1* | 2/2019 | Metzger .................. G01J 9/00 |
| 2019/0179146 A1 | 6/2019 | De Nardi |
| 2019/0197218 A1 | 6/2019 | Schwartz |
| 2019/0204929 A1 | 7/2019 | Attari et al. |

(56) References Cited

U.S. PATENT DOCUMENTS

| | | |
|---|---|---|
| 2019/0235629 A1 | 8/2019 | Hu et al. |
| 2019/0286263 A1 | 9/2019 | Bagheri et al. |
| 2019/0302161 A1 | 10/2019 | You et al. |
| 2019/0302193 A1 | 10/2019 | Maru et al. |
| 2019/0302890 A1 | 10/2019 | Marijanovic et al. |
| 2019/0302922 A1 | 10/2019 | Das et al. |
| 2019/0302923 A1 | 10/2019 | Maru et al. |
| 2019/0326906 A1 | 10/2019 | Camacho Cardenas et al. |
| 2019/0339313 A1 | 11/2019 | Vandermeijden |
| 2019/0377468 A1 | 12/2019 | Micci et al. |
| 2020/0064952 A1 | 1/2020 | Siemieniec et al. |
| 2020/0064160 A1* | 2/2020 | Maru ............... G01D 5/243 |
| 2020/0133455 A1 | 4/2020 | Sepehr et al. |
| 2020/0177290 A1 | 6/2020 | Reimer et al. |
| 2020/0191761 A1 | 6/2020 | Potyrailo et al. |
| 2020/0271477 A1 | 8/2020 | Kost et al. |
| 2020/0271706 A1 | 8/2020 | Wardlaw et al. |
| 2020/0271745 A1 | 8/2020 | Das et al. |
| 2020/0272301 A1 | 8/2020 | Duewer et al. |
| 2020/0319237 A1 | 10/2020 | Maru et al. |
| 2020/0320966 A1 | 10/2020 | Clark et al. |
| 2020/0373923 A1 | 11/2020 | Walsh et al. |
| 2020/0382113 A1 | 12/2020 | Beardsworth et al. |
| 2020/0386804 A1 | 12/2020 | Das et al. |
| 2021/0064137 A1 | 3/2021 | Wopat et al. |
| 2021/0140797 A1 | 5/2021 | Kost et al. |
| 2021/0149538 A1 | 5/2021 | LaPointe et al. |
| 2021/0152174 A1 | 5/2021 | Yancey et al. |
| 2021/0361940 A1 | 11/2021 | Yeh et al. |
| 2021/0396610 A1 | 12/2021 | Li et al. |
| 2021/0404901 A1 | 12/2021 | Kost et al. |
| 2021/0405764 A1 | 12/2021 | Hellman et al. |
| 2022/0075500 A1 | 3/2022 | Chang et al. |
| 2022/0268233 A1 | 8/2022 | Kennedy |
| 2022/0307867 A1 | 9/2022 | Das et al. |
| 2022/0308000 A1 | 9/2022 | Das et al. |
| 2022/0404409 A1 | 12/2022 | Maru et al. |

FOREIGN PATENT DOCUMENTS

| | | |
|---|---|---|
| CN | 107076623 A | 8/2017 |
| CN | 209069345 U | 7/2019 |
| DE | 4004450 A1 | 8/1991 |
| DE | 602004005672 T2 | 12/2007 |
| DE | 102015215330 A1 | 2/2017 |
| DE | 102015215331 A1 | 2/2017 |
| EP | 1697710 B1 | 4/2007 |
| EP | 2682843 A1 | 1/2014 |
| GB | 2394295 A | 4/2004 |
| GB | 2573644 A | 11/2019 |
| GB | 2582065 A | 9/2020 |
| GB | 2582864 A | 10/2020 |
| GB | 2586722 B | 2/2022 |
| JP | 2006246289 A | 9/2006 |
| KR | 20130052059 A | 5/2013 |
| WO | 00/33244 A2 | 6/2000 |
| WO | 20061354832 A2 | 12/2006 |
| WO | 2007068283 A1 | 6/2007 |
| WO | 2016032704 A1 | 3/2016 |
| WO | 2021101722 A1 | 5/2021 |
| WO | 2021101723 A1 | 5/2021 |

OTHER PUBLICATIONS

Combined Search and Examination Report, UKIPO, Application No. GB1904250.6, dated Sep. 10, 2019.
International Search Report and Written Opinion of the International Searching Authority, International Application No. PCT/US2019/022518, dated May 24, 2019.
International Search Report and Written Opinion of the International Searching Authority, International Application No. PCT/US2019/022578, dated May 27, 2019.
International Search Report and Written Opinion of the International Searching Authority, International Application No. PCT/US2019/021838, dated May 27, 2019.
Combined Search and Examination Report under Sections 17 and 18(3), UKIPO, Application No. GB2001341.3, dated Jun. 29, 2020.
International Search Report and Written Opinion of the International Searching Authority, International Application No. PCT/US2020/059113, dated Feb. 23, 2021.
International Search Report and Written Opinion of the International Searching Authority, International Application No. PCT/US2020/059101, dated Mar. 9, 2021.
International Search Report and Written Opinion of the International Searching Authority, International Application No. PCT/US2021/035695, dated Sep. 9, 20201.
Second Office Action, China National Intellectual Property Administration, Application No. 201980022689.9, dated Oct. 27, 2021.
Second Office Action, China National Intellectual Property Administration, Application No. 201980022693.5, dated Dec. 14, 2021.
Combined Search and Examination Report under Sections 17 and 18(3), UKIPO, Application No. GB2111666.0, dated Feb. 11, 2022.
Examination Report under Section 18(3), UKIPO, Application No. GB2101804.9, dated Feb. 25, 2022.
International Search Report and Written Opinion of the International Searching Authority, International Application No. PCT/US2022/012721, dated Apr. 26, 2022.
Second Office Action, China National Intellectual Property Administration, Application No. 201980022693.5, dated Apr. 13, 2022.
Examination Report under Section 18(3), UKIPO, Application No. GB2015439.9, dated May 10, 2022.
International Search Report and Written Opinion of the International Searching Authority, International Application No. PCT/US2022/018886, dated Jun. 10, 2022.
Combined Search and Examination Report under Sections 17 and 18(3), UKIPO, Application No. GB2201194.4, dated Jul. 1, 2022.
International Search Report and Written Opinion of the International Searching Authority, International Application No. PCT/US2022/018475, dated Aug. 2, 2022.
First Office Action, China National Intellectual Property Administration, Application No. 202010105829.3, dated Apr. 12, 2022, received by counsel Jul. 28, 2022.
Notice of Preliminary Rejection, Korean Intellectual Property Office, Application No. 10-2020-7029597, dated Jul. 29, 2022.
First Office Action, China National Intellectual Property Administration, Application No. 201980022689.9, dated Jun. 2, 2021.
First Office Action, China National Intellectual Property Administration, Application No. 201980022693.5, dated Jul. 8, 2021.
First Office Action, China National Intellectual Property Administration, Application No. 202080080853.4, dated Feb. 22, 2023.
Combined Search and Examination Report under Sections 17 and 18(3), United Kingdom Intellectual Property Office, Application No. GB2215005.6, dated Apr. 11, 2023.
Gao, Shuo, et al., Piezoelectric vs. Capactivie Based Force Sensing in Capacitive Touch Panels, IEEE Access, vol. 4, Jul. 14, 2016.
Second Office Action, China National Intellectual Property Administration, Application No. 201980054799.3, dated May 24, 2023.

* cited by examiner

GAIN AND MISMATCH CALIBRATION FOR A PHASE DETECTOR USED IN AN INDUCTIVE SENSOR

FIELD OF DISCLOSURE

The present disclosure relates in general to electronic devices with user interfaces, (e.g., mobile devices, game controllers, instrument panels, etc.), and more particularly, resonant phase sensing of resistive-inductive-capacitive sensors for use in a system for mechanical button replacement in a mobile device, and/or other suitable applications.

BACKGROUND

Many traditional mobile devices (e.g., mobile phones, personal digital assistants, video game controllers, etc.) include mechanical buttons to allow for interaction between a user of a mobile device and the mobile device itself. However, such mechanical buttons are susceptible to aging, wear, and tear that may reduce the useful life of a mobile device and/or may require significant repair if malfunction occurs. Also, the presence of mechanical buttons may render it difficult to manufacture mobile devices to be waterproof. Accordingly, mobile device manufacturers are increasingly looking to equip mobile devices with virtual buttons that act as a human-machine interface allowing for interaction between a user of a mobile device and the mobile device itself. Similarly, mobile device manufacturers are increasingly looking to equip mobile devices with other virtual interface areas (e.g., a virtual slider, interface areas of a body of the mobile device other than a touch screen, etc.). Ideally, for best user experience, such virtual interface areas should look and feel to a user as if a mechanical button or other mechanical interface were present instead of a virtual button or virtual interface area.

Presently, linear resonant actuators (LRAs) and other vibrational actuators (e.g., rotational actuators, vibrating motors, etc.) are increasingly being used in mobile devices to generate vibrational feedback in response to user interaction with human-machine interfaces of such devices. Typically, a sensor (traditionally a force or pressure sensor) detects user interaction with the device (e.g., a finger press on a virtual button of the device) and in response thereto, the linear resonant actuator may vibrate to provide feedback to the user. For example, a linear resonant actuator may vibrate in response to user interaction with the human-machine interface to mimic to the user the feel of a mechanical button click.

However, there is a need in the industry for sensors to detect user interaction with a human-machine interface, wherein such sensors provide acceptable levels of sensor sensitivity, power consumption, dynamic range, and size.

SUMMARY

In accordance with the teachings of the present disclosure, the disadvantages and problems associated with sensing of human-machine interface interactions in a mobile device may be reduced or eliminated.

In accordance with embodiments of the present disclosure, a system may include a resonant sensor configured to sense a physical quantity, a measurement circuit communicatively coupled to the resonant sensor and configured to measure one or more resonance parameters associated with the resonant sensor and indicative of the physical quantity using an incident/quadrature detector having an incident channel and a quadrature channel and perform a calibration of a non-ideality between the incident channel and the quadrature channel of the system, the calibration comprising determining the non-ideality by controlling the sensor signal, an oscillation signal for the incident channel, and an oscillation signal for the quadrature channel, and correcting for the non-ideality.

In accordance with these and other embodiments of the present disclosure, a system may include a resonant sensor configured to sense a physical quantity, a measurement circuit communicatively coupled to the resonant sensor and configured to measure a resonance parameter associated with the resonant sensor and indicative of the physical quantity during a normal operation mode, and in a calibration mode, perform a calibration comprising providing a known sensor signal to an input of the measurement circuit and measuring the resonance parameter in response to the known sensor signal; isolating a sensor drift contribution to the resonance parameter from a measurement circuit drift contribution to the resonance parameter based on the resonance parameter as measured during the normal operation mode and the resonance parameter as measured during the calibration mode; and correcting for the sensor drift contribution.

In accordance with these and other embodiments of the present disclosure, a method may include, in a system including a resonant sensor configured to sense a physical quantity, measuring one or more resonance parameters associated with the resonant sensor and indicative of the physical quantity using an incident/quadrature detector having an incident channel and a quadrature channel, and performing a calibration of a non-ideality between the incident channel and the quadrature channel of the system, the calibration comprising: determining the non-ideality by controlling the sensor signal, an oscillation signal for the incident channel, and an oscillation signal for the quadrature channel; and correcting for the non-ideality.

In accordance with these and other embodiments of the present disclosure, a method may include, in a system including a resonant sensor configured to sense a physical quantity, measuring a resonance parameter associated with the resonant sensor and indicative of the physical quantity during a normal operation mode; and in a calibration mode, performing a calibration comprising providing a known sensor signal to an input of the measurement circuit and measuring the resonance parameter in response to the known sensor signal; isolating a sensor drift contribution to the resonance parameter from a measurement circuit drift contribution to the resonance parameter based on the resonance parameter as measured during the normal operation mode and the resonance parameter as measured during the calibration mode; and correcting for the sensor drift contribution.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

Figure 4A:
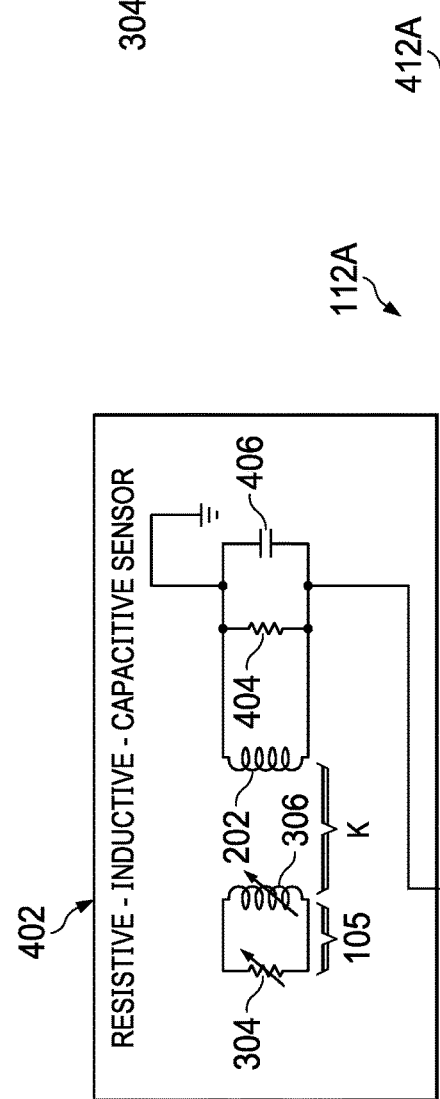
Figure 4B:
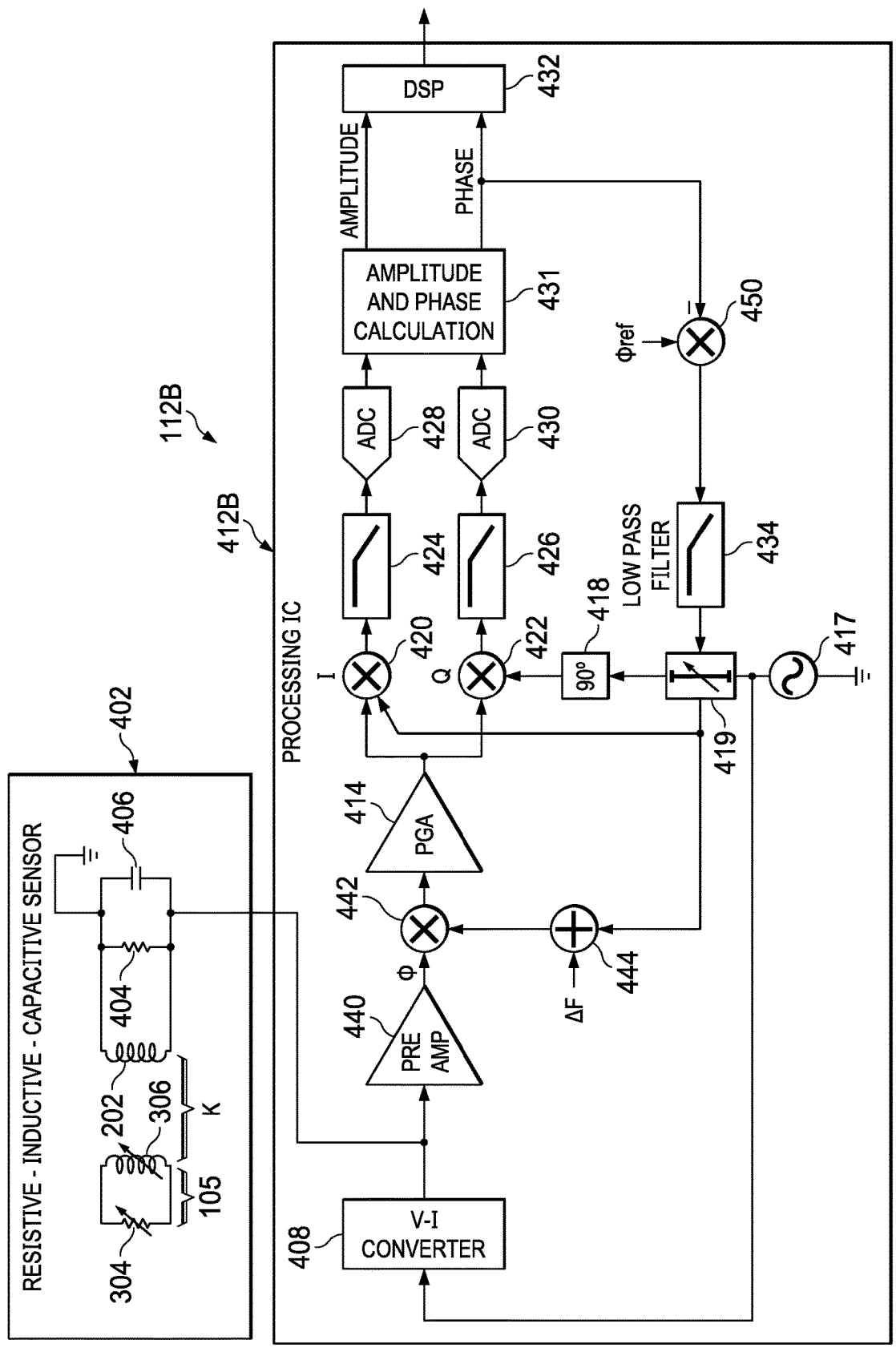
Figure 4C:
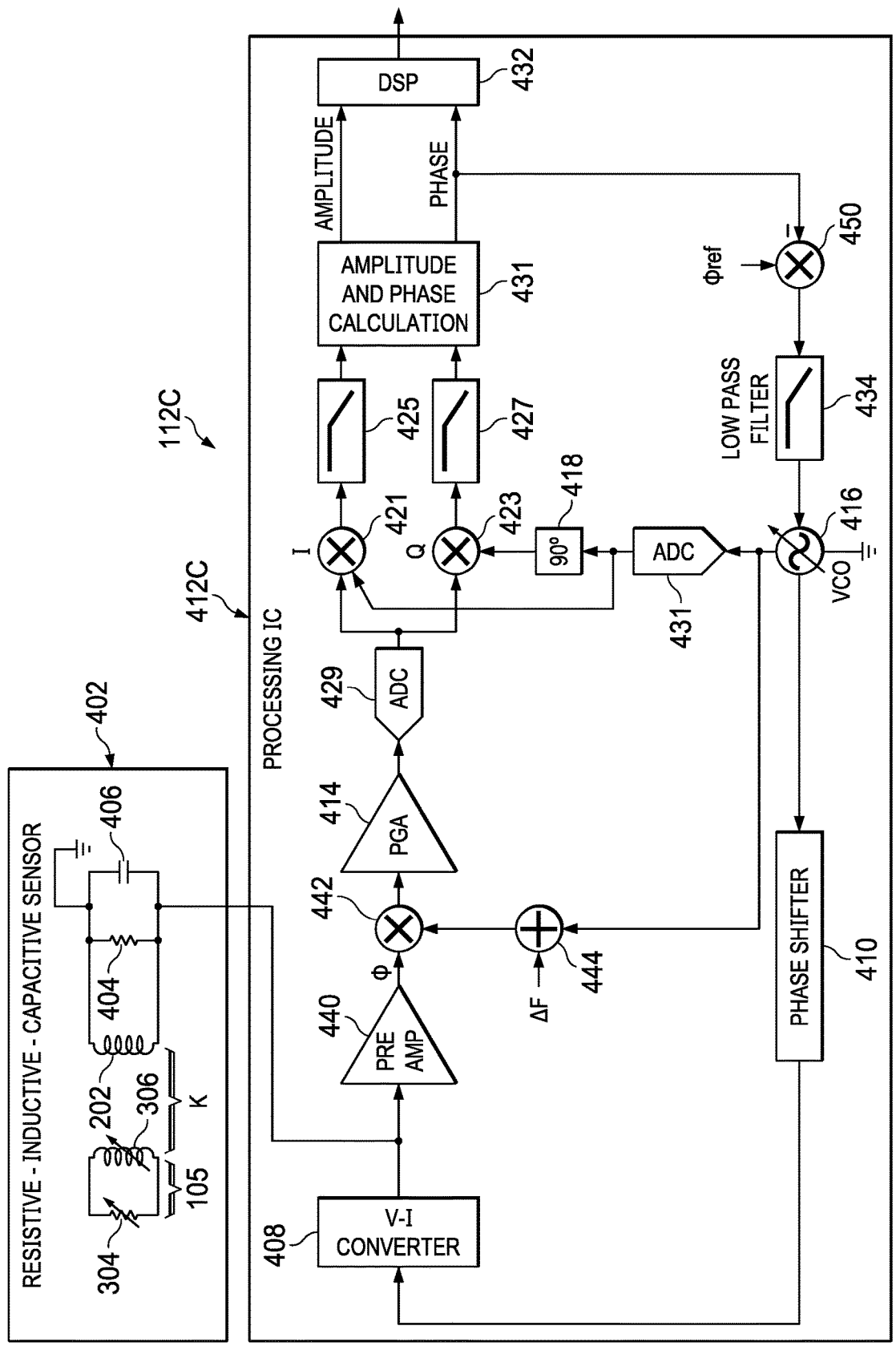
Figure 5:
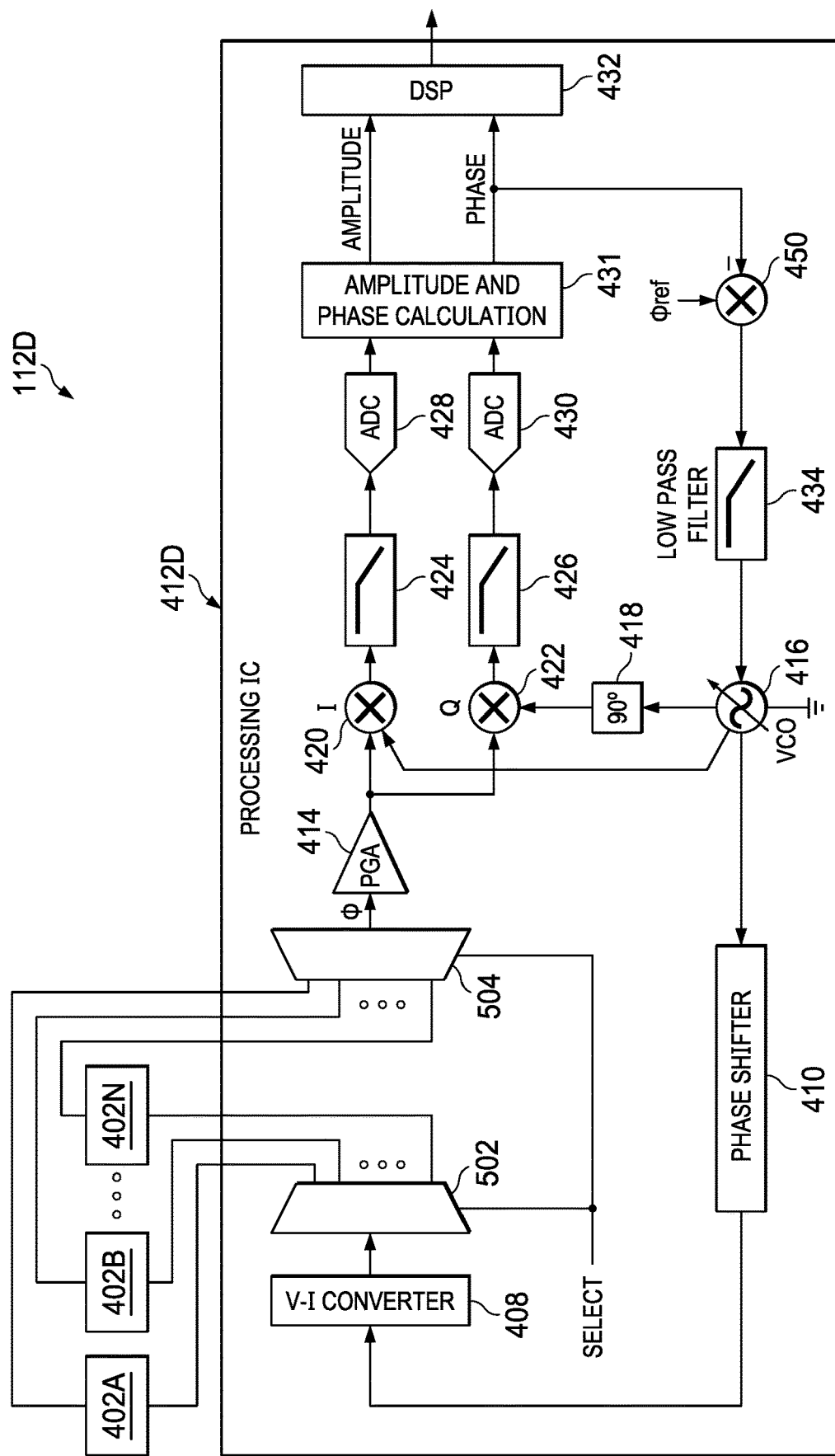
Figure 6A:
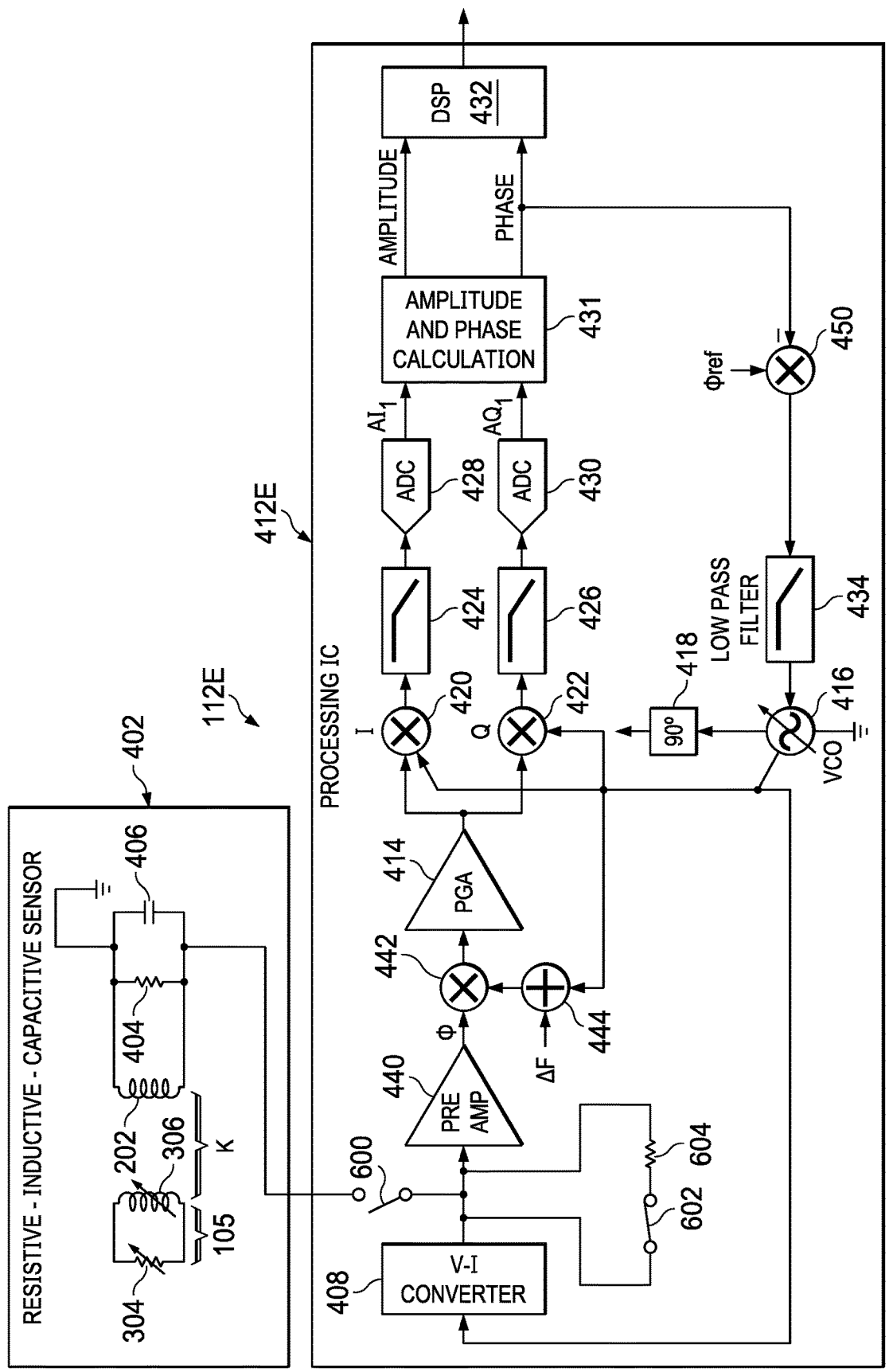
Figure 6B:
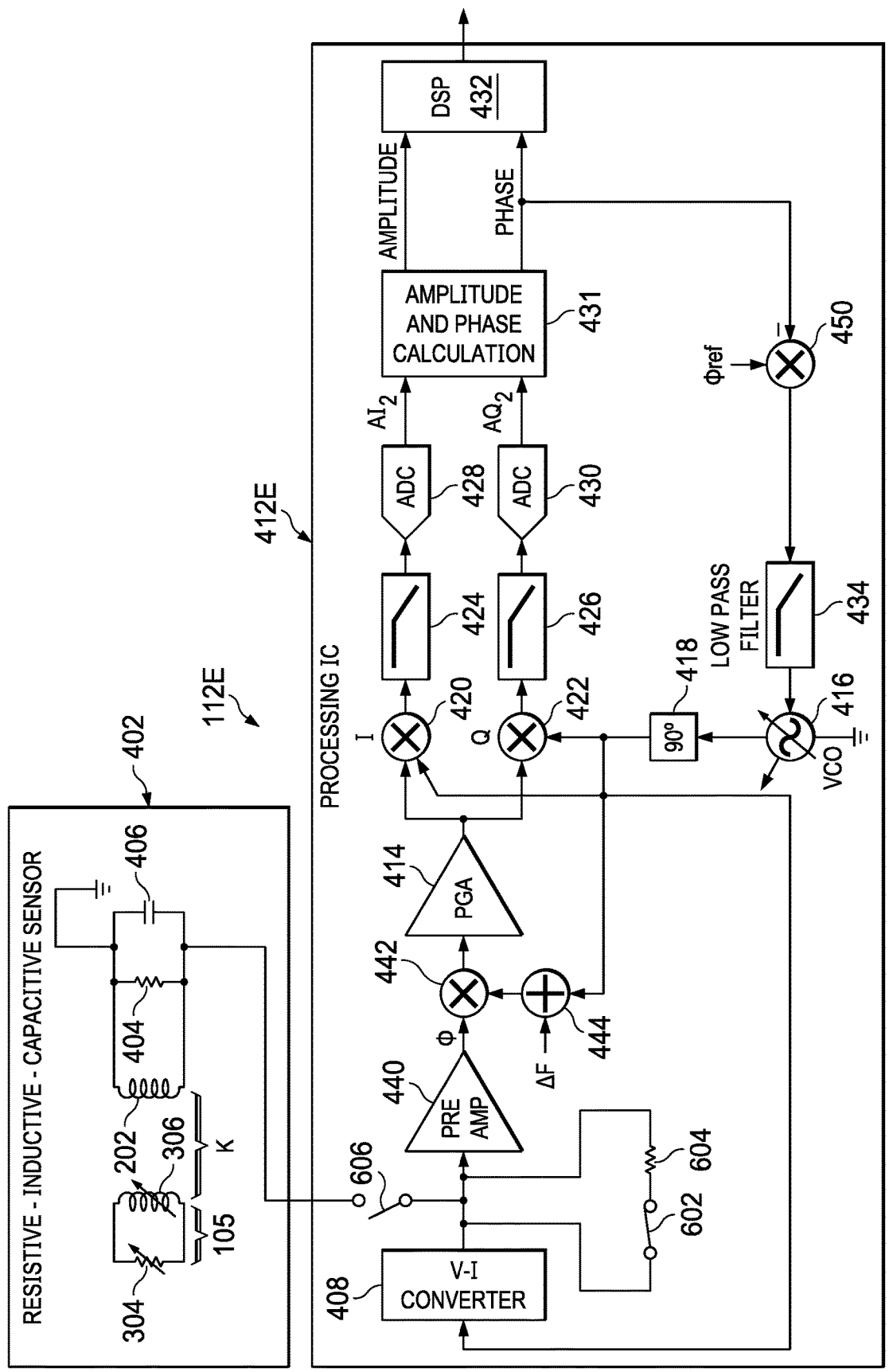
Figure 7A:
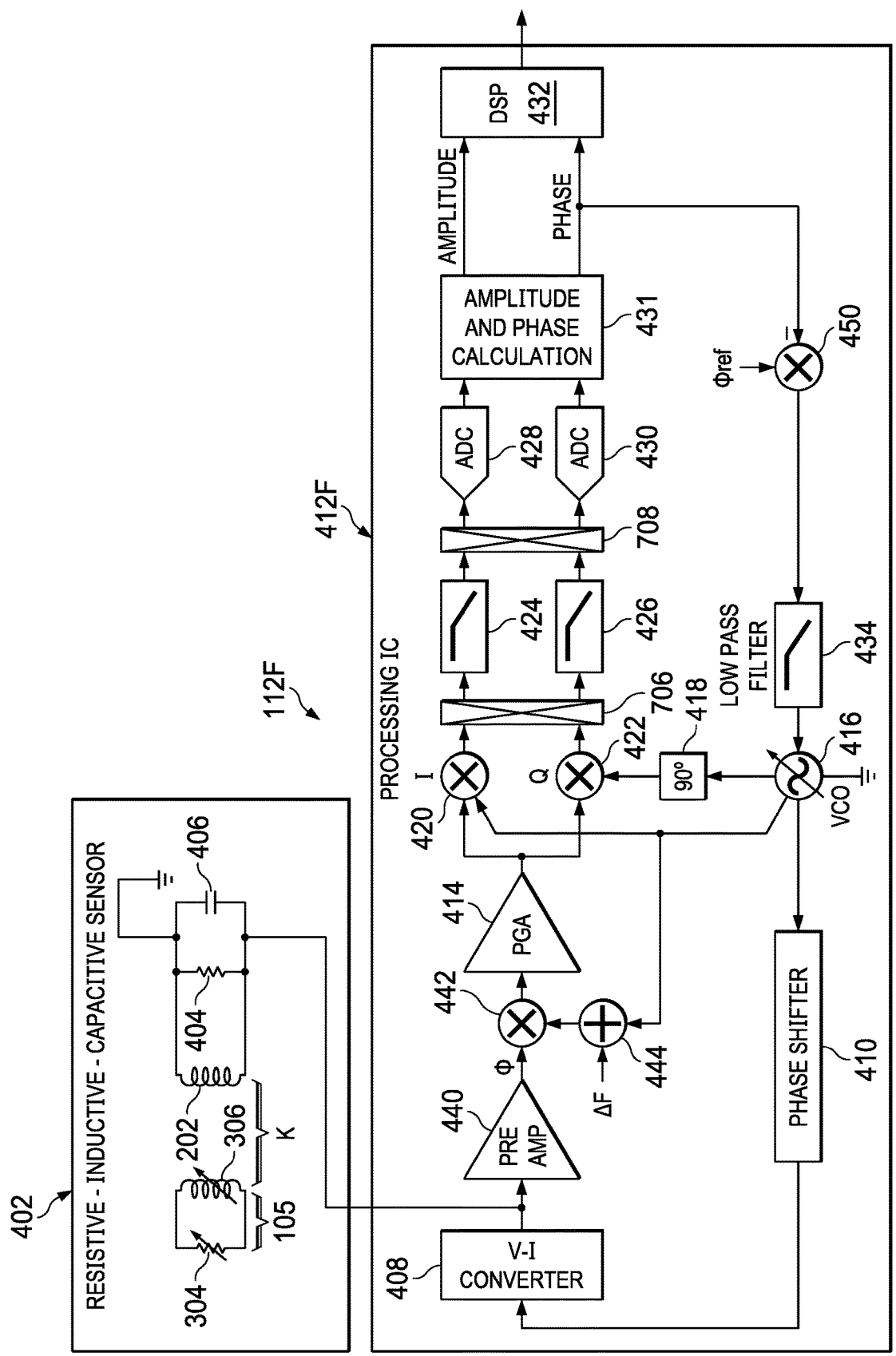
Figure 7B:
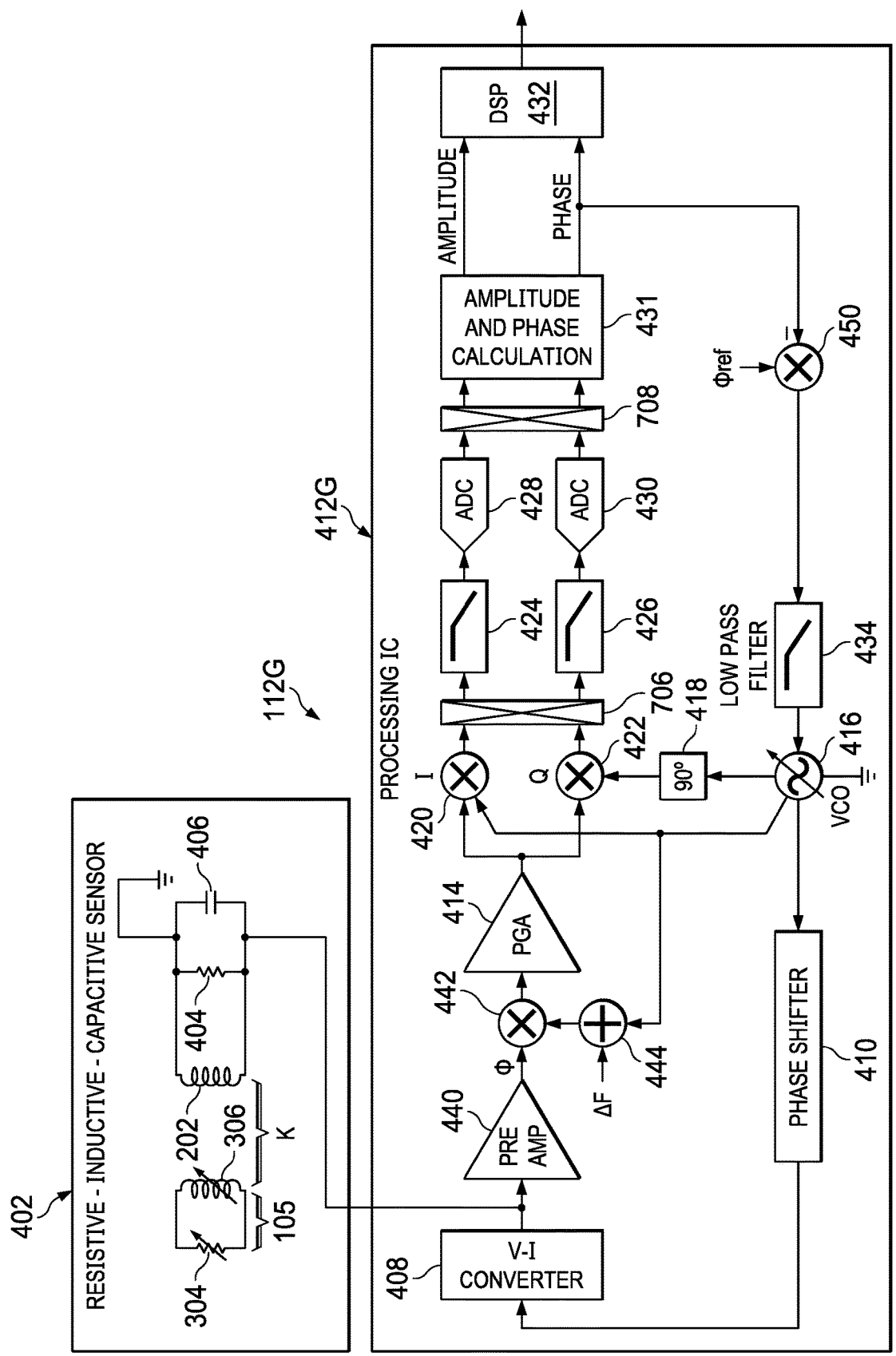
Figure 8A:
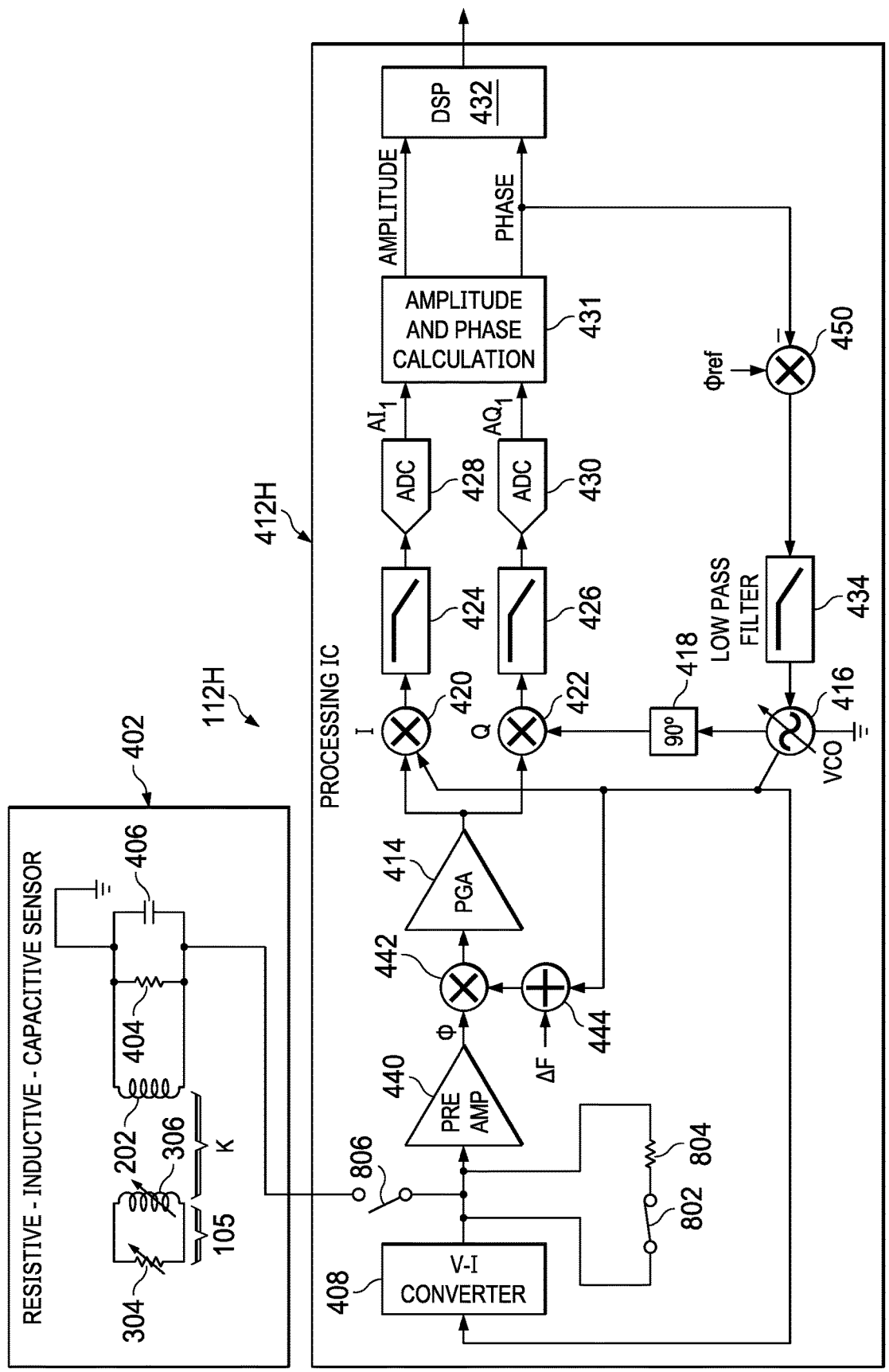
Figure 8B:
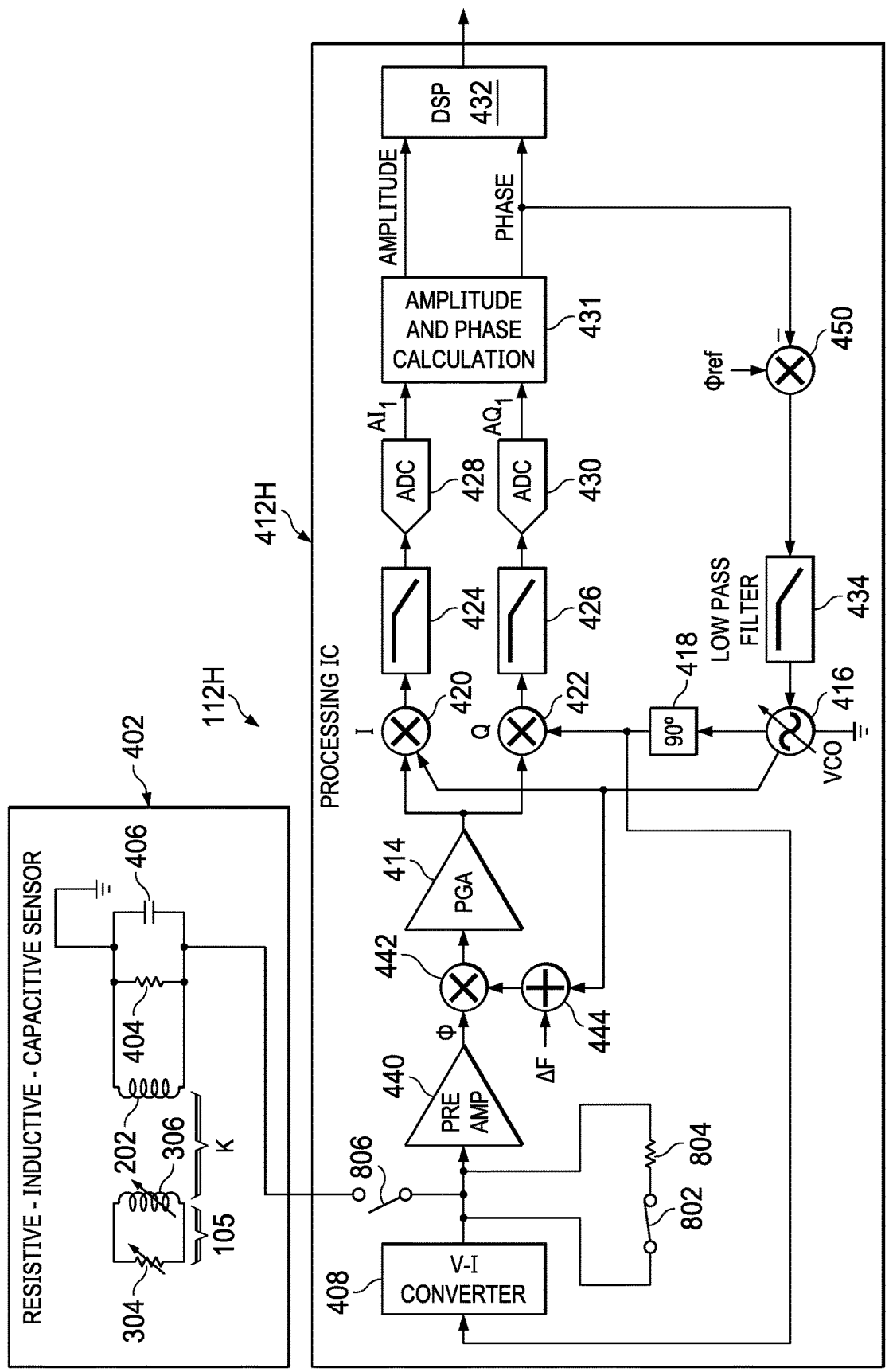
Figure 9:
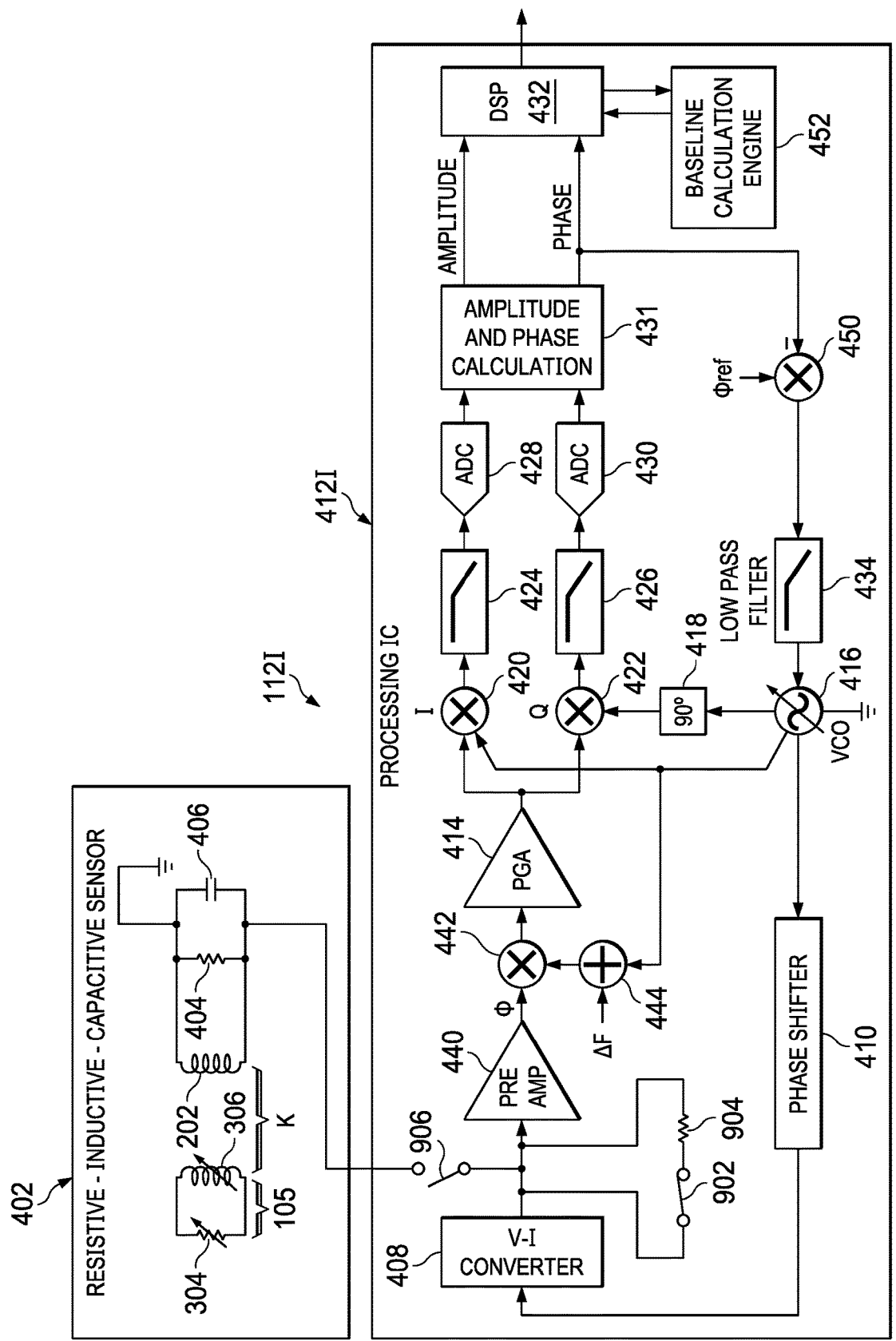

Each of FIGS. 4A-4C illustrates a diagram of selected components of an example resonant phase sensing system, in accordance with embodiments of the present disclosure;

FIG. 5 illustrates a diagram of selected components of an example resonant phase sensing system implementing time-division multiplexed processing of multiple resistive-inductive-capacitive sensors, in accordance with embodiments of the present disclosure;

FIGS. 6A and 6B each illustrate a diagram of selected components of an example resonant phase sensing system implementing gain mismatch calibration, in accordance with embodiments of the present disclosure;

FIGS. 7A and 7B each illustrate a diagram of selected components of an example resonant phase sensing system implementing gain mismatch calibration, in accordance with embodiments of the present disclosure;

FIGS. 8A and 8B each illustrate a diagram of selected components of an example resonant phase sensing system implementing phase mismatch calibration, in accordance with embodiments of the present disclosure; and FIG. 9 illustrates a diagram of selected components of an example resonant phase sensing system implementing baseline tracking, in accordance with embodiments of the present disclosure.

DETAILED DESCRIPTION

Figure 1:
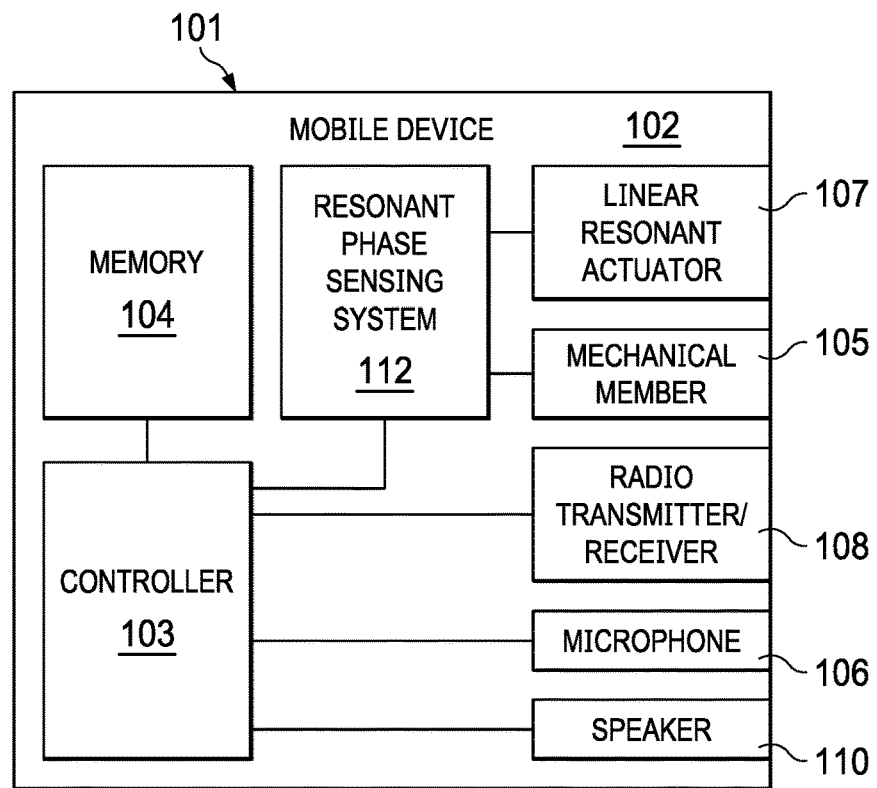
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, a controller 103, a memory 104, a mechanical member 105, a microphone 106, a linear resonant actuator 107, a radio transmitter/receiver 108, a speaker 110, and a resonant phase sensing system 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 may interpret and/or execute program instructions and/or process data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies based on sonic vibrations received at the diaphragm or membrane. Microphone 106 may include an electrostatic microphone, a condenser microphone, an electret microphone, a microelectromechanical systems (MEMS) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, speaker 110 may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The voice coil and the driver's magnetic system interact, generating a mechanical force that causes the voice coil (and thus, the attached cone) to move back and forth, thereby reproducing sound under the control of the applied electrical signal coming from the amplifier.

Mechanical member 105 may be housed within or upon enclosure 101, and may include any suitable system, device, or apparatus configured such that all or a portion of mechanical member 105 displaces in position responsive to a force, a pressure, or a touch applied upon or proximately to mechanical member 105. In some embodiments, mechanical member 105 may be designed to appear as a mechanical button on the exterior of enclosure 101.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107. As described elsewhere in this disclosure, a linear resonant actuator 107, based on a signal received from resonant phase sensing system 112, may render haptic feedback to a user of mobile device 102 for at least one of mechanical button replacement and capacitive sensor feedback.

Together, mechanical member 105 and linear resonant actuator 107 may form a human-interface device, such as a virtual interface (e.g., a virtual button), which, to a user of mobile device 102, has a look and feel of a mechanical button or other mechanical interface of mobile device 102.

Resonant phase sensing system 112 may be housed within enclosure 101, may be communicatively coupled to mechanical member 105 and linear resonant actuator 107, and may include any system, device, or apparatus configured to detect a displacement of mechanical member 105 indicative of a physical interaction (e.g., by a user of mobile device 102) with the human-machine interface of mobile device 102 (e.g., a force applied by a human finger to a virtual interface of mobile device 102). As described in greater detail below, resonant phase sensing system 112 may detect displacement of mechanical member 105 by performing resonant phase sensing of a resistive-inductive-capacitive sensor for which an impedance (e.g., inductance, capacitance, and/or resistance) of the resistive-inductive-capacitive sensor changes in response to displacement of mechanical member 105. Thus, mechanical member 105 may comprise any suitable system, device, or apparatus which all or a portion thereof may displace, and such displacement may cause a change in an impedance of a resistive-inductive-capacitive sensor integral to resonant phase sensing system 112. Resonant phase sensing system 112 may also generate an electronic signal for driving linear resonant actuator 107 in response to a physical interaction associated with a human-machine interface associated with mechanical member 105. Detail of an example resonant phase sensing system 112 in accordance with embodiments of the present disclosure is depicted in greater detail below.

Although specific example components are depicted in FIG. 1 as being integral to mobile device 102 (e.g., controller 103, memory 104, mechanical member 105, microphone 106, radio transmitter/receiver 108, speakers(s) 110, linear resonant actuator 107, etc.), a mobile device 102 in accordance with this disclosure may comprise one or more components not specifically enumerated above. For example, although FIG. 1 depicts certain user interface components, mobile device 102 may include one or more other user interface components in addition to those depicted in FIG. 1, including but not limited to a keypad, a touch screen, and a display, thus allowing a user to interact with and/or otherwise manipulate mobile device 102 and its associated components. In addition, although FIG. 1 depicts only a single virtual button comprising mechanical member 105 and linear resonant actuator 107 for purposes of clarity and exposition, in some embodiments a mobile device 102 may have multiple virtual interfaces each comprising a respective mechanical member 105 and linear resonant actuator 107.

Although, as stated above, resonant phase sensing system 112 may detect displacement of mechanical member 105 by performing resonant phase sensing of a resistive-inductive-capacitive sensor for which an impedance (e.g., inductance, capacitance, and/or resistance) of the resistive-inductive-capacitive sensor changes in response to displacement of mechanical member 105, in some embodiments, resonant phase sensing system 112 may primarily detect displacement of mechanical member 105 by using resonant phase sensing to determine a change in an inductance of a resistive-inductive-capacitive sensor. For example, FIGS. 2 and 3 illustrate selected components of an example inductive sensing application that may be implemented by resonant phase sensing system 112, in accordance with embodiments of the present disclosure.

Figure 2:
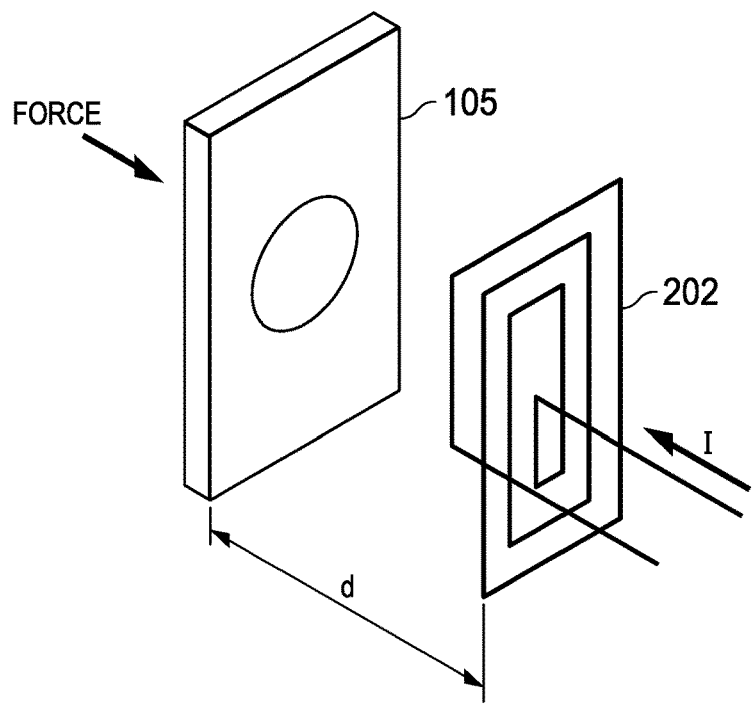
FIG. 2 illustrates a mechanical member separated by a distance from an inductive coil, in accordance with embodiments of the present disclosure.
Figure 3:
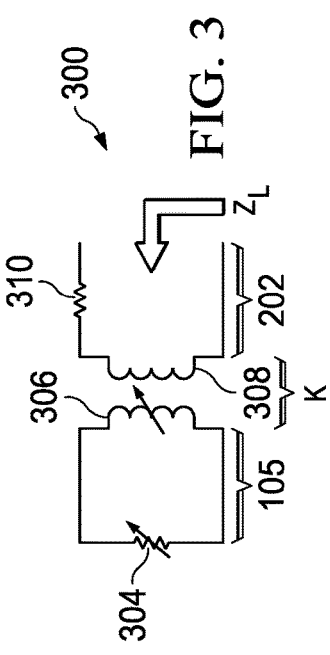
FIG. 3 illustrates selected components of an inductive sensing system that may be implemented by a resonant phase sensing system, in accordance with embodiments of the present disclosure.

FIG. 2 illustrates mechanical member 105 embodied as a metal plate separated by a distance d from an inductive coil 202, in accordance with embodiments of the present disclosure. FIG. 3 illustrates selected components of an inductive sensing system 300 that may be implemented by resonant phase sensing system 112, in accordance with embodiments of the present disclosure. As shown in FIG. 3, inductive sensing system 300 may include mechanical member 105, modeled as a variable electrical resistance 304 and a variable electrical inductance 306, and may include inductive coil 202 in physical proximity to mechanical member 105 such that inductive coil 202 has a mutual inductance with mechanical member 105 defined by a variable coupling coefficient k. As shown in FIG. 3, inductive coil 202 may be modeled as a variable electrical inductance 308 and a variable electrical resistance 310.

In operation, as a current I flows through inductive coil 202, such current may induce a magnetic field which in turn may induce an eddy current inside mechanical member 105. When a force is applied to and/or removed from mechanical member 105, which alters distance d between mechanical member 105 and inductive coil 202, the coupling coefficient k, variable electrical resistance 304, and/or variable electrical inductance 306 may also change in response to the change in distance. These changes in the various electrical parameters may, in turn, modify an effective impedance $Z_L$ of inductive coil 202.

FIG. 4A illustrates a diagram of selected components of an example resonant phase sensing system 112A, in accordance with embodiments of the present disclosure. In some embodiments, resonant phase sensing system 112A may be used to implement resonant phase sensing system 112 of FIG. 1. As shown in FIG. 4A, resonant phase sensing system 112A may include a resistive-inductive-capacitive sensor 402 and a processing integrated circuit (IC) 412A.

As shown in FIG. 4A, resistive-inductive-capacitive sensor 402 may include mechanical member 105, inductive coil 202, a resistor 404, and capacitor 406, wherein mechanical member 105 and inductive coil 202 have a variable coupling coefficient k. Although shown in FIG. 4A to be arranged in parallel with one another, it is understood that inductive coil 202, resistor 404, and capacitor 406 may be arranged in any other suitable manner that allows resistive-inductive-capacitive sensor 402 to act as a resonant tank. For example, in some embodiments, inductive coil 202, resistor 404, and capacitor 406 may be arranged in series with one another. In some embodiments, resistor 404 may not be implemented with a stand-alone resistor, but may instead be implemented by a parasitic resistance of inductive coil 202, a parasitic resistance of capacitor 406, and/or any other suitable parasitic resistance.

Processing IC 412A may be communicatively coupled to resistive-inductive-capacitive sensor 402 and may comprise any suitable system, device, or apparatus configured to implement a measurement circuit to measure phase information associated with resistive-inductive-capacitive sensor 402 and based on the phase information, determine a displacement of mechanical member 105 relative to resistive-inductive-capacitive sensor 402. Thus, processing IC 412A may be configured to determine an occurrence of a physical interaction (e.g., press or release of a virtual button) associated with a human-machine interface associated with mechanical member 105 based on the phase information.

As shown in FIG. 4A, processing IC 412A may include a phase shifter 410, a voltage-to-current converter 408, a preamplifier 440, an intermediate frequency mixer 442, a combiner 444, a programmable gain amplifier (PGA) 414, a voltage-controlled oscillator (VCO) 416, a phase shifter 418, an amplitude and phase calculation block 431, a DSP 432, a low-pass filter 434, and a combiner 450. Processing IC 412A may also include a coherent incident/quadrature detector implemented with an incident channel comprising a mixer 420, a low-pass filter 424, and an analog-to-digital converter (ADC) 428, and a quadrature channel comprising a mixer 422, a low-pass filter 426, and an ADC 430 such that processing IC 412A is configured to measure the phase information using the coherent incident/quadrature detector.

Phase shifter 410 may include any system, device, or apparatus configured to detect an oscillation signal generated by processing IC 412A (as explained in greater detail below) and phase shift such oscillation signal (e.g., by 45 degrees) such that a normal operating frequency of resonant phase sensing system 112A, an incident component of a sensor signal $\phi$ generated by pre-amplifier 440, is approximately equal to a quadrature component of sensor signal $\phi$, so as to provide common mode noise rejection by a phase detector implemented by processing IC 412A, as described in greater detail below.

Voltage-to-current converter 408 may receive the phase shifted oscillation signal from phase shifter 410, which may be a voltage signal, convert the voltage signal to a corresponding current signal, and drive the current signal on resistive-inductive-capacitive sensor 402 at a driving frequency with the phase-shifted oscillation signal in order to generate sensor signal $\phi$ which may be processed by processing IC 412A, as described in greater detail below. In some embodiments, a driving frequency of the phase-shifted oscillation signal may be selected based on a resonant frequency of resistive-inductive-capacitive sensor 402 (e.g., may be approximately equal to the resonant frequency of resistive-inductive-capacitive sensor 402).

Preamplifier 440 may receive sensor signal $\phi$ and condition sensor signal $\phi$ for frequency mixing, with mixer 442, to an intermediate frequency $\Delta f$ combined by combiner 444 with an oscillation frequency generated by VCO 416, as described in greater detail below, wherein intermediate frequency $\Delta f$ is significantly less than the oscillation frequency. In some embodiments, preamplifier 440, mixer 442, and combiner 444 may not be present, in which case PGA 414 may receive sensor signal $\phi$ directly from resistive-inductive-capacitive sensor 402. However, when present, preamplifier 440, mixer 442, and combiner 444 may allow for mixing sensor signal $\phi$ down to a lower intermediate frequency $\Delta f$ which may allow for lower-bandwidth and more efficient ADCs (e.g., ADCs 428 and 430 of FIGS. 4A and 4B and ADC 429 of FIG. 4C, described below) and/or which may allow for minimization of phase and/or gain mismatches in the incident and quadrature paths of the phase detector of processing IC 412A.

In operation, PGA 414 may further amplify sensor signal $\phi$ to condition sensor signal $\phi$ for processing by the coherent incident/quadrature detector. VCO 416 may generate an oscillation signal to be used as a basis for the signal driven by voltage-to-current converter 408, as well as the oscillation signals used by mixers 420 and 422 to extract incident and quadrature components of amplified sensor signal $\phi$. As shown in FIG. 4A, mixer 420 of the incident channel may use an unshifted version of the oscillation signal generated by VCO 416, while mixer 422 of the quadrature channel may use a 90-degree shifted version of the oscillation signal phase shifted by phase shifter 418. As mentioned above, the oscillation frequency of the oscillation signal generated by VCO 416 may be selected based on a resonant frequency of resistive-inductive-capacitive sensor 402 (e.g., may be approximately equal to the resonant frequency of resistive-inductive-capacitive sensor 402).

In the incident channel, mixer 420 may extract the incident component of amplified sensor signal $\phi$, low-pass filter 424 may filter out the oscillation signal mixed with the amplified sensor signal $\phi$ to generate a direct current (DC) incident component, and ADC 428 may convert such DC incident component into an equivalent incident component digital signal for processing by amplitude and phase calculation block 431. Similarly, in the quadrature channel, mixer 422 may extract the quadrature component of amplified sensor signal $\phi$, low-pass filter 426 may filter out the phase-shifted oscillation signal mixed with the amplified sensor signal $\phi$ to generate a direct current (DC) quadrature component, and ADC 430 may convert such DC quadrature component into an equivalent quadrature component digital signal for processing by amplitude and phase calculation block 431.

Amplitude and phase calculation block 431 may include any system, device, or apparatus configured to receive phase information comprising the incident component digital signal and the quadrature component digital signal and based thereon, extract amplitude and phase information.

DSP 432 may include any system, device, or apparatus configured to interpret and/or execute program instructions and/or process data. In particular, DSP 432 may receive the phase information and the amplitude information generated by amplitude and phase calculation block 431 and based thereon, determine a displacement of mechanical member 105 relative to resistive-inductive-capacitive sensor 402, which may be indicative of an occurrence of a physical interaction (e.g., press or release of a virtual button or other interaction with a virtual interface) associated with a human-machine interface associated with mechanical member 105 based on the phase information. DSP 432 may also generate an output signal indicative of the displacement. In some embodiments, such output signal may comprise a control signal for controlling mechanical vibration of linear resonant actuator 107 in response to the displacement. Further, as described in greater detail below, DSP 432 may be configured to perform functionality for maximizing dynamic range of resonant phase sensing system 112A.

The phase information generated by amplitude and phase calculation block 431 may be subtracted from a reference phase $\phi_{ref}$ by combiner 450 in order to generate an error signal that may be received by low-pass filter 434. Low-pass filter 434 may low-pass filter the error signal, and such filtered error signal may be applied to VCO 416 to modify the frequency of the oscillation signal generated by VCO 416, in order to drive sensor signal $\phi$ towards reference phase $\phi_{ref}$. As a result, sensor signal $\phi$ may comprise a transient decaying signal in response to a "press" of a virtual button (or other interaction with a virtual interface) associated with resonant phase sensing system 112A as well as another transient decaying signal in response to a subsequent "release" of the virtual button (or other interaction with a virtual interface). Accordingly, low-pass filter 434 in connection with VCO 416 may implement a feedback control loop that may track changes in operating parameters of resonant phase sensing system 112A by modifying the driving frequency of VCO 416.

FIG. 4B illustrates a diagram of selected components of an example resonant phase sensing system 112B, in accordance with embodiments of the present disclosure. In some embodiments, resonant phase sensing system 112B may be used to implement resonant phase sensing system 112 of FIG. 1. Resonant phase sensing system 112B of FIG. 4B may be, in many respects, similar to resonant phase sensing system 112A of FIG. 4A. Accordingly, only those differences between resonant phase sensing system 112B and resonant phase sensing system 112A may be described below. As shown in FIG. 4B, resonant phase sensing system 112B may include processing IC 412B in lieu of processing IC 412A. Processing IC 412B of FIG. 4B may be, in many respects, similar to processing IC 412A of FIG. 4A. Accordingly, only those differences between processing IC 412B and processing IC 412A may be described below.

Processing IC 412B may include fixed-frequency oscillator 417 and variable phase shifter 419 in lieu of VCO 416 of processing IC 412A. Thus, in operation, oscillator 417 may drive a fixed driving signal and oscillation signal which variable phase shifter 419 may phase shift to generate oscillation signals to be mixed by mixers 420 and 422. Similar to that of processing IC 412A, low-pass filter 434 may low-pass filter an error signal based on phase information extracted by amplitude and phase calculation block 431, but instead such filtered error signal may be applied to variable phase shifter 419 to modify the phase offset of the oscillation signal generated by oscillator 417, in order to drive sensor signal $\phi$ towards indicating a phase shift of zero. As a result, sensor signal $\phi$ may comprise a transient decaying signal in response to a "press" of a virtual button (or other interaction with a virtual interface) associated with resonant phase sensing system 112B as well as another transient decaying signal in response to a subsequent "release" of the virtual button (or other interaction with a virtual interface). Accordingly, low-pass filter 434 in connection with variable phase shifter 419 may implement a feedback control loop that may track changes in operating parameters of resonant phase sensing system 112B by modifying the phase shift applied by variable phase shifter 419.

FIG. 4C illustrates a diagram of selected components of an example resonant phase sensing system 112C, in accordance with embodiments of the present disclosure. In some embodiments, resonant phase sensing system 112C may be used to implement resonant phase sensing system 112 of FIG. 1. Resonant phase sensing system 112C of FIG. 4C may be, in many respects, similar to resonant phase sensing system 112A of FIG. 4A. Accordingly, only those differences between resonant phase sensing system 112C and resonant phase sensing system 112A may be described below. For example, a particular difference between resonant phase sensing system 112C and resonant phase sensing system 112A is that resonant phase sensing system 112C may include ADC 429 in lieu of ADC 428 and ADC 430. Accordingly, a coherent incident/quadrature detector for resonant phase sensing system 112C may be implemented with an incident channel comprising a digital mixer 421 and a digital low-pass filter 425 (in lieu of analog mixer 420 and analog low-pass filter 424) and a quadrature channel comprising a digital mixer 423 and a low-pass filter 427 (in lieu of analog mixer 422 and analog low-pass filter 426) such that processing IC 412C is configured to measure the phase information using such coherent incident/quadrature detector. Although not explicitly shown, resonant phase sensing system 112B could be modified in a manner similar to that of how resonant phase sensing system 112A is shown to be modified to result in resonant phase sensing system 112C.

FIG. 5 illustrates a diagram of selected components of an example resonant phase sensing system 112D implementing time-division multiplexed processing of multiple resistive-inductive-capacitive sensors 402 (e.g., resistive-inductive-capacitive sensors 402A-402N shown in FIG. 5), in accordance with embodiments of the present disclosure. In some embodiments, resonant phase sensing system 112D may be used to implement resonant phase sensing system 112 of FIG. 1. Resonant phase sensing system 112D of FIG. 5 may be, in many respects, similar to resonant phase sensing system 112A of FIG. 4A. Accordingly, only those differences between resonant phase sensing system 112D and resonant phase sensing system 112A may be described below. In particular, resonant phase sensing system 112D may include a plurality of resistive-inductive-capacitive sensors 402 (e.g., resistive-inductive-capacitive sensors 402A-402N shown in FIG. 5) in lieu of the single resistive-inductive-capacitive sensor 402 shown in FIG. 4A. In addition, resonant phase sensing system 112D may include multiplexers 502 and 504, each of which may select an output signal from a plurality of input signals responsive to a control signal SELECT (which may be controlled by a time-division multiplexing control subsystem implemented by controller 103 or another suitable component of mobile device 102). Thus, while in some embodiments a device such as mobile device 102 may comprise a plurality of resistive-inductive-capacitive sensors 402 which may be simultaneously driven and separately processed by a respective processing IC, in other embodiments a resonant phase sensing system (e.g., resonant phase sensing system 112D) may drive resistive-inductive-capacitive sensors 402 in a time-division multiplexed manner. Such approach may reduce power consumption and device size as compared with multiple-sensor implementations in which the multiple sensors are simultaneously driven and/or sensed. Device size may be reduced by time-division multiplexing multiple sensors into a single driver and measurement circuit channel, wherein only a single driver and a single measurement circuit may be required, thus minimizing an amount of integrated circuit area needed to perform driving and measurement. In addition, by leveraging a single driver and measurement circuit, no calibration may be needed to adjust for mismatches and/or errors between different drivers and/or different measurement circuits.

For purposes of clarity and exposition, preamplifier 440, mixer 442, and combiner 444 have been excluded from FIG. 5. However, in some embodiments, processing IC 412D may include preamplifier 440, mixer 442, and combiner 444 similar to that depicted in FIGS. 4A-4C.

In resonant phase sensing system 112D, when a first resistive-inductive-capacitive sensor (e.g., resistive-inductive-capacitive sensor 402A) is selected by the time-division multiplexing control subsystem for being driven by voltage-to-current converter 408 and measured by the measurement circuit implemented by processing IC 412A, other resistive-inductive-capacitive sensors (e.g., resistive-inductive-capacitive sensors 402B-402N) may each be placed in a low-impedance state. Similarly, when a second resistive-inductive-capacitive sensor (e.g., resistive-inductive-capacitive sensor 402B) is selected by the time-division multiplexing control subsystem for being driven by voltage-to-current converter 408 and measured by the measurement circuit implemented by processing IC 412A, other resistive-inductive-capacitive sensors (e.g., resistive-inductive-capacitive sensors other than 402B, including 402A) may each be placed in a low-impedance state. Such an approach may minimize power consumption within unselected resistive-inductive-capacitive sensors 402.

Although not explicitly shown, resonant phase sensing system 112B could be modified in a manner similar to that of how resonant phase sensing system 112A is shown to be modified to result in resonant phase sensing system 112D, such that resonant phase sensing system 112B could implement time-division multiplexed sensing on a plurality of resistive-inductive-capacitive sensors 402. Similarly, although not explicitly shown, resonant phase sensing system 112C could be modified in a manner similar to that of how resonant phase sensing system 112A is shown to be modified to result in resonant phase sensing system 112D, such that resonant phase sensing system 112C could implement time-division multiplexed sensing on a plurality of resistive-inductive-capacitive sensors 402.

The foregoing resonant phase sensing systems 112A-D may include many non-linearities that may affect measurement accuracy. Such non-idealities may introduce errors in the measured output phase of resonant phase sensing system 112. For example, offsets may exist between the incident channel of the incident/quadrature detector implemented by processing ICs 412, which may result mostly from analog circuit components not common between the incident channel and the quadrature channel. As another example, phase mismatch may exist between the incident channel and the quadrature channel, which may result mostly from mixer clock phase mismatches between the incident channel and the quadrature channel. As a further example, gain mismatch may exist between the incident channel and the quadrature channel, which may result mostly from analog circuit components not common between the incident channel and the quadrature channel and/or from mixer duty-induced gain variations.

Such non-idealities may vary over temperature, process, and voltage variations, and may also be affected post-packaging due to mechanical stress. However, calibrating and correcting for these non-idealities during manufacture, testing/validation, and/or at runtime may reduce non-linearity in measurement by resonant phase sensing system 112.

FIGS. 6A and 6B each illustrate a diagram of selected components of an example resonant phase sensing system 112E implementing gain mismatch calibration, in accordance with embodiments of the present disclosure. In some embodiments, resonant phase sensing system 112E may be used to implement resonant phase sensing system 112 of FIG. 1. Resonant phase sensing system 112E of FIGS. 6A and 6B may be, in many respects, similar to resonant phase sensing system 112A of FIG. 4A. Accordingly, only those differences between resonant phase sensing system 112E and resonant phase sensing system 112A may be described below. As shown in FIGS. 6A and 6B, resonant phase sensing system 112E may include processing IC 412E in lieu of processing IC 412A. Processing IC 412E of FIGS. 6A and 6B may be, in many respects, similar to processing IC 412A of FIG. 4A. Accordingly, only those differences between processing IC 412E and processing IC 412A may be described below.

As shown in FIGS. 6A and 6B, processing IC 412E may include a calibration resistor 604 that may be, during a calibration mode of processing IC 412E, coupled between the output of voltage-to-current converter 408 and the input of pre-amplifier 440 via a series switch 602 that may be activated (e.g., enabled, closed, turned on) during the calibration mode and deactivated (e.g., disabled, open, turned off) during a normal operating mode of processing IC 412E. In some embodiments, a resistance of resistor 604 may be selected to match a resistance of resistor 404. Further, processing IC 412E may include a switch 606 that may be activated during the normal operating mode to couple resistive-inductive-capacitive sensor 402 to the processing path of processing IC 412E and may be deactivated during the calibration mode to decouple resistive-inductive-capacitive sensor 402 from the processing path of processing IC 412E. For purposes of clarity and exposition, signal paths for control signals of switches 602 and 606 are not shown in FIGS. 6A and 6B. However, such control signals may be generated by DSP 432 or in any other suitable manner.

In the calibration mode, processing IC 412E may operate in a first sub-mode, depicted in FIG. 6A, and a second sub-mode, depicted in FIG. 6B. In the first sub-mode, the output of VCO 416 may be input to the input of voltage-to-current converter 408 and used as an oscillation signal by both mixers 420 and 422, resulting in calibration signal $AI_1$ output by ADC 428 and calibration signal $AQ_1$ output by ADC 430. DSP 432 may calculate a first gain calibration signal $G_{CAL1}$ as the ratio $G_{CAL1}=AI_1/AQ_1$, which represents a gain error between the incident channel and the quadrature channel due to all factors except duty-cycle variations between the oscillation signal generated by VCO 416 and the oscillation signal generated by phase shifter 418 during the normal operating mode of processing IC 412E. In the second sub-mode, the output of phase shifter 418 may be input to the input of voltage-to-current converter 408 and used as an oscillation signal by both mixers 420 and 422, resulting in calibration signal $AI_2$ output by ADC 428 and calibration signal $AQ_2$ output by ADC 430. DSP 432 may calculate a second gain calibration signal $G_{CAL2}$ as the ratio $G_{CAL2}=AQ_2/AQ_1$, or $G_{CAL2}=(AQ_2+AI_2)/(AQ_1+AI_1)$, either formulation of which represents a mixer-duty cycle based gain mismatch. From first gain calibration signal $G_{CAL1}$ and second gain calibration signal $G_{CAL2}$, DSP 432 may calculate a total gain calibration signal $G_{CALTOT}$ as $G_{CALTOT}=G_{CAL1} \cdot G_{CAL2}$. Based on total gain calibration signal $G_{CALTOT}$, DSP 432 may apply a correction in the normal operating mode to either or both of the outputs of ADC 428 and 430 (e.g., within calculation logic of amplitude and phase calculation block 431).

For purposes of clarity and exposition, switches for operating in the first-sub mode and the second sub-mode, as well as signal paths for control signals of such switches are not shown in FIGS. 6A and 6B. However, processing IC 412E may include any suitable switches or other circuit devices suitable for providing the functionality shown in FIGS. 6A and 6B, and control signals for such switches or other circuit devices may be generated by DSP 432 or in any other suitable manner.

Although not explicitly shown, resonant phase sensing system 112B could be modified in a manner similar to that of how resonant phase sensing system 112A is shown to be modified to result in resonant phase sensing system 112E, such that resonant phase sensing system 112B could implement gain calibration in a similar manner to resonant phase sensing system 112E. Similarly, although not explicitly shown, resonant phase sensing system 112C could be modified in a manner similar to that of how resonant phase sensing system 112A is shown to be modified to result in resonant phase sensing system 112E, such that resonant phase sensing system 112C could implement gain calibration in a similar manner to resonant phase sensing system 112E. Further, resonant phase sensing system 112D could be modified in a manner similar to that of how resonant phase sensing system 112A is shown to be modified to result in resonant phase sensing system 112E, such that resonant phase sensing system 112D could implement gain calibration in a similar manner to resonant phase sensing system 112E.

FIG. 7A illustrates a diagram of selected components of an example resonant phase sensing system 112F implementing gain mismatch calibration, in accordance with embodiments of the present disclosure. In some embodiments, resonant phase sensing system 112F may be used to implement resonant phase sensing system 112 of FIG. 1. Resonant phase sensing system 112F of FIG. 7A may be, in many respects, similar to resonant phase sensing system 112A of FIG. 4A. Accordingly, only those differences between resonant phase sensing system 112F and resonant phase sensing system 112A may be described below. As shown in FIG. 7A, resonant phase sensing system 112F may include processing IC 412F in lieu of processing IC 412A. Processing IC 412F of FIG. 7A may be, in many respects, similar to processing IC 412A of FIG. 4A. Accordingly, only those differences between processing IC 412F and processing IC 412A may be described below.

As shown in FIG. 7A, during the calibration mode, processing IC 412F may chop the signals output by mixers 420 and 422 with a chopping block 706 and may chop the signals output by low-pass filters 424 and 426 with a chopping block 708, resulting in calibration signal AI output by ADC 428 and calibration signal AQ output by ADC 430. Amplitude and phase calculation block 431 may calculate phase over two consecutive scan cycles, a first scan cycle without signals chopped between the incident channel and quadrature channel, and a second scan cycle with signals chopped between the incident channel and quadrature channel. In the first scan cycle, amplitude and phase calculation block 431 may calculate a measured phase $\varphi_1$ given by $$\varphi_1 = \arctan\left(\frac{k \cdot AQ}{AI}\right),$$

where k represents a gain mismatch between the incident channel and the quadrature channel. In the second scan cycle, amplitude and phase calculation block 431 may calculate a measured phase $\varphi_2$ given by $$\varphi_2 = \arctan\left(\frac{AQ}{kAI}\right).$$

Amplitude and phase calculation block 431 may average over the two scan cycles $$\varphi = \frac{\varphi_1 + \varphi_2}{2},$$

such that every phase measurement determination is an average of the last two measurements, and thus effectively cancelling out gain mismatch k.

FIG. 7B illustrates a diagram of selected components of an example resonant phase sensing system 112G implementing gain mismatch calibration, in accordance with embodiments of the present disclosure. In some embodiments, resonant phase sensing system 112G may be used to implement resonant phase sensing system 112 of FIG. 1. Resonant phase sensing system 112G of FIG. 7B may be, in many respects, similar to resonant phase sensing system 112F of FIG. 7A. Accordingly, only those differences between resonant phase sensing system 112G and resonant phase sensing system 112F may be described below. As shown in FIG. 7B, resonant phase sensing system 112F may include processing IC 412G in lieu of processing IC 412F. Processing IC 412G of FIG. 7B may be, in many respects, similar to processing IC 412F of FIG. 7A. Accordingly, only those differences between processing IC 412G and processing IC 412F may be described below.

As shown in FIG. 7B, processing IC 412G may include chopping block 708 at the outputs of ADCs 428 and 430, instead of at the inputs of ADCs 428 and 430, as shown in FIG. 7A.

FIGS. 8A and 8B each illustrate a diagram of selected components of an example resonant phase sensing system 112H implementing phase mismatch calibration, in accordance with embodiments of the present disclosure. In some embodiments, resonant phase sensing system 112H may be used to implement resonant phase sensing system 112 of FIG. 1. Resonant phase sensing system 112H of FIGS. 8A and 8B may be, in many respects, similar to resonant phase sensing system 112A of FIG. 4A. Accordingly, only those differences between resonant phase sensing system 112H and resonant phase sensing system 112A may be described below. As shown in FIGS. 8A and 8B, resonant phase sensing system 112H may include processing IC 412H in lieu of processing IC 412A. Processing IC 412H of FIGS. 8A and 8B may be, in many respects, similar to processing IC 412A of FIG. 4A. Accordingly, only those differences between processing IC 412H and processing IC 412A may be described below.

As shown in FIGS. 8A and 8B, processing IC 412H may include a calibration resistor 804 that may be, during a calibration mode of processing IC 412H, coupled between the output of voltage-to-current converter 408 and the input of pre-amplifier 440 via a series switch 802 that may be activated (e.g., enabled, closed, turned on) during the calibration mode and deactivated (e.g., disabled, open, turned off) during a normal operating mode of processing IC 412H. In some embodiments, a resistance of resistor 804 may be selected to match a resistance of resistor 404. Further, processing IC 412H may include a switch 806 that may be activated during the normal operating mode to couple resistive-inductive-capacitive sensor 402 to the processing path of processing IC 412H and may be deactivated during the calibration mode to decouple resistive-inductive-capacitive sensor 402 from the processing path of processing IC 412H. For purposes of clarity and exposition, signal paths for control signals of switches 802 and 806 are not shown in FIGS. 8A and 8B. However, such control signals may be generated by DSP 432 or in any other suitable manner.

In the calibration mode, processing IC 412H may operate in a first sub-mode, depicted in FIG. 8A, and a second sub-mode, depicted in FIG. 8B. In the first sub-mode, the output of VCO 416 may be input to the input of voltage-to-current converter 408 and used as an oscillation signal by mixer 420, while the output of phase shifter 418 may be used as an oscillation signal by mixer 422, resulting in calibration signal $AI_1$ output by ADC 428 and calibration signal $AQ_1$ output by ADC 430. DSP 432 may calculate a first phase calibration signal $\varphi_1$ given by $$\varphi_1 = \arctan\left(\frac{AQ_1}{AI_1}\right).$$

In the second sub-mode, the output of phase shifter 418 may be input to the input of voltage-to-current converter 408 and used as an oscillation signal by mixer 422, while the output of phase shifter 418 may be used as an oscillation signal by mixer 420, resulting in calibration signal $AI_2$ output by ADC 428 and calibration signal $AQ_2$ output by ADC 430. DSP 432 may calculate a second phase calibration signal $\varphi_2$ given by $$\varphi_2 = \arctan\left(\frac{AQ_2}{AI_2}\right).$$

In the absence of phase mismatch, $\varphi_2=90°-\varphi_1$. Thus, DSP 432 may apply a phase correction $\varphi_{COR}=90°-(\varphi_1+\varphi_2)$.

DSP 432 may apply such correction in the normal operating mode to either or both of the outputs of ADC 428 and 430 (e.g., within calculation logic of amplitude and phase calculation block 431). Theoretically, such phase correction could be applied directly to the output of amplitude and phase calculation block 431 as an offset. However, because the phase mismatch-induced error may be dependent upon the input signal phase, applying the phase correction in this manner may at best reduce phase mismatch by 50%. Accordingly, to more accurately correct for phase mismatch, the phase correction may be applied to the outputs of ADC 428 and 430, splitting the correction factor between the incident channel and the quadrature channel as a function of the input signal phase. For example, if the input signal phase is at 45°, the phase correction may be evenly split between the incident channel and the quadrature channel. As another example, if the input signal phase is at 0°, the phase correction may be applied entirely to the quadrature channel. As a further example, if the input signal phase is at 30°, the phase correction may be split between one-third of the correction to the incident channel and two-thirds of the correction to the quadrature channel.

In some embodiments, the phase correction applied by processing IC 412H may need to be determined and applied after all other calibrations (e.g., gain calibration) have been applied.

For purposes of clarity and exposition, switches for operating in the first-sub mode and the second sub-mode, as well as signal paths for control signals of such switches are not shown in FIGS. 8A and 8B. However, processing IC 412H may include any suitable switches or other circuit devices suitable for providing the functionality shown in FIGS. 8A and 8B, and control signals for such switches or other circuit devices may be generated by DSP 432 or in any other suitable manner.

Although not explicitly shown, resonant phase sensing system 112B could be modified in a manner similar to that of how resonant phase sensing system 112A is shown to be modified to result in resonant phase sensing system 112E, such that resonant phase sensing system 112B could implement phase calibration in a similar manner to resonant phase sensing system 112H. Similarly, although not explicitly shown, resonant phase sensing system 112C could be modified in a manner similar to that of how resonant phase sensing system 112A is shown to be modified to result in resonant phase sensing system 112H, such that resonant phase sensing system 112C could implement phase calibration in a similar manner to resonant phase sensing system 112H. Further, resonant phase sensing system 112D could be modified in a manner similar to that of how resonant phase sensing system 112A is shown to be modified to result in resonant phase sensing system 112H, such that resonant phase sensing system 112D could implement phase calibration in a similar manner to resonant phase sensing system 112H.

In some embodiments, a resonant phase sensing system 112 may combine two or more of the gain and/or phase mismatch techniques described above with respect to FIGS. 6A-8B.

A calibration mode for resonant phase sensing system 112 may be triggered by any suitable event. For example, in some embodiments, the calibration mode may be triggered during product testing and engineering for resonant phase sensing system 112. As another example, in some embodiments, the calibration mode may be triggered in response to a change of temperature associated with resonant phase sensing system 112, as detected by a temperature sensor. As an additional example, in some embodiments, the calibration mode may be triggered in response to a change of a supply voltage associated with resonant phase sensing system 112. As a further example, in some embodiments, the calibration mode may be triggered in response to a change in operating frequency of a mixer (e.g., one or more of mixers 442, 420, and 422) of a processing IC 412. Moreover, in some embodiments, the calibration mode may be triggered in response to a change in a gain of any gain element (e.g., preamplifier 440, PGA 414, low-pass filter 424, low-pass filter 426, etc.) within a processing IC 412. Additionally, in some embodiments, the calibration mode may be triggered in response to a malfunction and/or shift in operating point for resonant phase sensing system 112.

In some embodiments, resonant phase sensing system 112 may also be configured to calculate a direct current offset and apply a correction factor to compensate for such offset. For example, in a first step of an offset calibration mode, DSP 432 or another component of a processing IC 412 may cause the inputs of ADC 428 and ADC 430 to be shorted to a direct current bias or common-mode voltage, and the outputs of ADC 428 and ADC 430 may be measured. The measured differential output of ADC 428 and 430, which may be represented as OUT, may be given by $OUT=ADC_{off}$, where $ADC_{off}$ represents an offset between ADC 428 and 430. In a second step of the offset calibration mode, inputs of low-pass filters 424 and 426 (which may each include a programmable gain amplifier) may be shorted to a direct current bias or common-mode voltage with zero alternating current input, and the outputs of ADC 428 and ADC 430 may be measured. For the second step, the measured differential output OUT may be given by OUT=FILT$_{off}$·G$_{FILT}$+ADC$_{off}$, where FILT$_{off}$ is the offset between low-pass filters 424 and 426, and G$_{FILT}$ is the direct-current gain of low-pass filters 424 and 426. In a third step of the offset calibration mode, inputs to mixers 420 and 422 may be provided with a common-mode voltage with zero alternating current input, and the outputs of ADC 428 and ADC 430 may be measured. For the third step, the measured differential output OUT may be given by OUT=(LO_FT+FILT$_{off}$) G$_{FILT}$+ADC$_{off}$, where LO_FT refers to a local oscillation signal communicated to mixers 420 and 422. In a fourth step of the offset calibration mode, inputs to mixers 420 and 422 may be provided with a direct current bias with zero alternating current input, and the outputs of ADC 428 and ADC 430 may be measured. For the fourth step, the measured differential output OUT may be given by OUT=(MIXER$_{off}$+FILT$_{off}$)·G$_{FILT}$+ADC$_{off}$, where MIXER$_{off}$ is the offset between mixers 420 and 422.

In some embodiments, a processing IC 412 may be configured to independently control transmit clock phases (e.g., driven by voltage-to-current converter 408) and receive clock phases (e.g., oscillation signals for mixers 420 and 422) relative to each other to correct for non-idealities by averaging measurements using a pre-determined pattern of transmit and receive phase relationships. For example, to determine offset error or flicker noise (also known as 1/f noise), a calibration mode may average phase measurements for transmit phases of 0° and 180°. As another example, to determine non-idealities resulting from harmonic mixing, a calibration mode may average phase measurements for at least transmit phases of 0° and 45° (more phases may improve calibration for harmonic mixing). As a further example, to determine gain mismatch, a calibration mode may average phase measurements for transmit phases of 0°, 45°, 90°, and 135°. As an additional example, to determine mismatch for a combination of non-idealities, a calibration mode may average phase measurements for transmit phases of 0°, 45°, 90°, and 135°. Further, to measure for phase mismatch, the transmit phase may be adjusted such that it is perfectly orthogonal to the quadrature channel phase, causing the output of the quadrature channel to be 0 (normalized) and output of the incident channel to be 1 (normalized to 1). Thus, any divergence of the output of the incident channel from 1 would be to phase mismatch, which may be inferred as $\varphi_{COR}=\cos^{-1}(AI)$, where AI is the output of the incident channel.

Although the foregoing contemplates transmit phases 0°, 45°, 90°, and 135°, other transmit phases (e.g., 5°, 10°, 22.5°, etc.) may be used based on the application and the non-ideality to be corrected.

In some embodiments, it may be preferable when correcting for non-idealities to first calculate and correct for offset, then calculate and correct for gain mismatch, and then calculate and correct for phase mismatch.

In addition to using calibration resistor 604 and calibration resistor 804 during a calibration mode to calibrate for gain mismatch, phase mismatch, or other mismatches, as shown above, a similar calibration resistor may be used in a similar calibration mode to detect a change or drift in measured phase to aid in baseline tracking. For resonant sensing, as often used in a human-machine interface, baseline tracking generally attempts to distinguish all signal movements not resulting from human interaction. A challenge in the implementation of a virtual button using a resonant sensor may be the challenge in achieving the accurate discrimination between actual user interaction with the virtual button and anomalous sensor inputs such as those caused by force sensor drift (e.g., due to aging and temperature) and/or device bending. Examples of baseline tracking are described in U.S. patent application Ser. No. 16/866,175, filed May 4, 2020 and U.S. patent application Ser. No. 17/080,455, filed Oct. 26, 2020, both of which are incorporated by reference herein, in their entireties.

FIG. 9 illustrates a diagram of selected components of an example resonant phase sensing system 112I implementing baseline tracking, in accordance with embodiments of the present disclosure. In some embodiments, resonant phase sensing system 112I may be used to implement resonant phase sensing system 112 of FIG. 1. Resonant phase sensing system 112I of FIG. 9 may be, in many respects, similar to resonant phase sensing system 112A of FIG. 4A. Accordingly, only those differences between resonant phase sensing system 112I and resonant phase sensing system 112A may be described below. As shown in FIG. 9, resonant phase sensing system 112I may include processing IC 412I in lieu of processing IC 412A. Processing IC 412I of FIG. 9 may be, in many respects, similar to processing IC 412A of FIG. 4A. Accordingly, only those differences between processing IC 412I and processing IC 412A may be described below.

As shown in FIG. 9, processing IC 412I may include a calibration resistor 904 that may be, during a calibration mode of processing IC 412I, coupled between the output of voltage-to-current converter 408 and the input of pre-amplifier 440 via a series switch 902 that may be activated (e.g., enabled, closed, turned on) during the calibration mode and deactivated (e.g., disabled, open, turned off) during a normal operating mode of processing IC 412I. In some embodiments, a resistance of resistor 904 may be selected to match a resistance of resistor 404. Further, processing IC 412I may include a switch 906 that may be activated during the normal operating mode to couple resistive-inductive-capacitive sensor 402 to the processing path of processing IC 412I and may be deactivated during the calibration mode to decouple resistive-inductive-capacitive sensor 402 from the processing path of processing IC 412I. For purposes of clarity and exposition, signal paths for control signals of switches 902 and 906 are not shown in FIG. 9. However, such control signals may be generated by DSP 432 or in any other suitable manner.

Further, processing IC 412I may include a baseline calculation engine 452. Baseline calculation engine 452 may comprise any system, device, or apparatus configured to, as described in greater detail below, calculate an appropriate baseline sensor input for processing a sensor signal $\phi$ as a user interaction with force sensor 105/mechanical member 305 in order to discriminate between user interactions and anomalous force sensor 105/mechanical member 305 sensor signal $\phi$ variations, such as those caused by drift of physical parameters (e.g., aging, temperature, etc.) of force sensor 105, mechanical member 305, resonant phase sensing system 113, etc. Although FIG. 9 depicts that, in some embodiments, baseline calculation engine 452 is external to DSP 432, in some embodiments, functionality of baseline calculation engine 452 may be implemented in whole or part by DSP 432.

A drift in measured phase output by amplitude and phase calculation block 431 may result from either changes in resistive-inductive-capacitive sensor 402 (e.g., sensor resonance drift, sensor quality factor drift, change in sensor temperature, mechanical relaxation effects, etc.) or changes in measurement circuitry (changes in temperature of processing IC 412I, changes in a phase response of a circuitry block, a drift in oscillation signals generated by VCO 416, a change to a supply voltage for processing IC 412I, etc.). A drift in measured phase output by amplitude and phase calculation block 431 due to these two factors may not be distinguishable from each other, using known baseline tracking approaches. However, baseline tracking may benefit and may be more accurate if baseline calculation engine 452 is able to distinguish between phase drift caused by resistive-inductive-capacitive sensor 402 and phase drift caused by processing IC 412I. By being able to distinguish between phase drift caused by resistive-inductive-capacitive sensor 402 and phase drift caused by processing IC 412I, processing IC 412I may also be able to quantify drift of resistive-inductive-capacitive sensor 402, quantify an absolute phase of resistive-inductive-capacitive sensor 402, trigger new sensor quality factor and resonance frequency measurements, trigger calibration of clocking circuitry (e.g. VCO 416) of processing IC 412I, and/or make benefit of other advantages.

In operation, for each scan period of resistive-inductive-capacitive sensor 402 that may result in a phase measurement of resistive-inductive-capacitive sensor 402, processing IC 412I may enter a calibration mode to obtain a phase measurement at the output of amplitude and phase calculation block 431 resulting from resistor 904 being used in place of resistive-inductive-capacitive sensor 402. The phase contribution from processing IC 412I may be common to both measurements, and the phase contribution from resistive-inductive-capacitive sensor 402 may be the only difference between the two measurements. Accordingly, the difference between the two measurements may provide DSP 432 and baseline calculation engine 452 with changes in phase caused only by resistive-inductive-capacitive sensor 402, and such difference may be used by baseline calculation engine 452 to track drift in resistive-inductive-capacitive sensor 402 (e.g., sensor resonance drift, sensor quality factor drift, change in sensor temperature, mechanical relaxation effects, etc.).

In alternative embodiments, drift of resistive-inductive-capacitive sensor 402 may be determined by using two different resistors (e.g., resistor 904 in a first calibration sub-mode and another resistor in place of resistive-inductive-capacitive sensor 402 in a second calibration sub-mode), and obtaining phase measurements at the output of amplitude and phase calculation block 431 resulting from each of the two calibration sub-modes. The difference in phase measurement between the two calibration sub-modes may be a function of the phase contribution from processing IC 412I.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
   a resonant sensor configured to sense a physical quantity; and
   a measurement circuit communicatively coupled to the resonant sensor and configured to:
   measure one or more resonance parameters associated with the resonant sensor and indicative of the physical quantity using an incident/quadrature detector having an incident channel and a quadrature channel;
   perform a calibration of a non-ideality between the incident channel and the quadrature channel of the system, the calibration comprising:
   determining the non-ideality by controlling the sensor signal, an oscillation signal for the incident channel, and an oscillation signal for the quadrature channel; and
   correcting for the non-ideality;
   wherein the non-ideality comprises one of a gain mismatch, a phase mismatch, and an offset.

2. The system of claim 1, the calibration further comprising providing a known sensor signal to the inputs of the incident channel and the quadrature channel.

3. The system of claim 1, wherein the non-ideality comprises a phase mismatch and the calibration comprises:
- applying the oscillation signal for the incident channel to the sensor signal and the incident channel and applying the oscillation signal for the quadrature channel to the quadrature channel to determine a first phase value based on outputs of the incident channel and the quadrature channel;
- applying the oscillation signal for the incident channel to the incident channel and applying the oscillation signal for the quadrature channel to the sensor signal and the quadrature channel to determine a second phase value based on outputs of the incident channel and the quadrature channel; and
- determining the phase mismatch based on the first phase value and the second phase value.

4. The system of claim 1, wherein the non-ideality comprises an offset and the calibration comprises:
- for a plurality of points within the incident channel, shorting each such particular point in the incident channel to a corresponding particular point of the quadrature channel to determine based on outputs of the incident channel and the quadrature channel an offset between the incident channel and the quadrature channel existing from the particular point and the corresponding particular point to the outputs of the incident channel and the quadrature channel.

5. The system of claim 1, wherein the non-ideality comprises a phase mismatch and the calibration comprises:
- signal chopping at two pairs of corresponding points within the incident channel and the quadrature channel; and
- determining a measured phase of the system by averaging two consecutive samples of each of the outputs of the incidental channel and the quadrature channel such that a first of the two consecutive samples results from a lack of signal chopping within the incident channel and the quadrature channel and a second of the two consecutive samples results from signal chopping within the incident channel and the quadrature channel, such averaging correcting for the phase mismatch.

6. The system of claim 1, the measurement circuit further configured to determine the non-ideality by:
- controlling the sensor signal, the oscillation signal for the incident channel, and the oscillation signal for the quadrature channel using a pre-determined pattern of phase relationships among the sensor signal, the oscillation signal for the incident channel, and the oscillation signal for the quadrature channel;
- wherein the non-ideality is based on average measurements of the outputs of the incident channel and the quadrature channel among the pre-determined pattern of phase relationships.

7. The system of claim 6, wherein the non-ideality comprises one of offset error and flicker noise, and the pre-determined pattern of phase relationships includes phase differences of 0° and 180°.

8. The system of claim 6, wherein the non-ideality comprises harmonic mixing, and the pre-determined pattern of phase relationships includes phase differences of 0° and 45°.

9. The system of claim 6, wherein the non-ideality comprises gain mismatch, and the pre-determined pattern of phase relationships includes phase differences of 0°, 45°, 90°, and 135°.

10. The system of claim 6, wherein the non-ideality comprises a combination of non-idealities, and the pre-determined pattern of phase relationships includes phase differences of 0°, 45°, 90°, and 135°.

11. The system of claim 1, wherein the physical quantity is indicative of user interaction with a human-machine interface.

12. The system of claim 1, wherein the physical quantity is indicative of a displacement of a mechanical member relative to the resonant sensor.

13. The system of claim 1, wherein the non-ideality comprises a gain mismatch and the calibration comprises:
- applying the oscillation signal for the incident channel to the sensor signal, the incident channel, and the quadrature channel to determine a first gain correction factor based on outputs of the incident channel and the quadrature channel;
- applying the oscillation signal for the quadrature channel to the sensor signal, the incident channel, and the quadrature channel to determine a second gain correction factor based on outputs of the incident channel and the quadrature channel; and
- determining the gain mismatch based on the first gain correction factor and the second gain correction factor.

14. The system of claim 13, the measurement circuit further configured to perform a second calibration of a phase mismatch between the incident channel and the quadrature channel of the system, the second calibration comprising:
- applying the oscillation signal for the incident channel to the sensor signal and the incident channel and applying the oscillation signal for the quadrature channel to the quadrature channel to determine a first phase value based on outputs of the incident channel and the quadrature channel;
- applying the oscillation signal for the incident channel to the incident channel and applying the oscillation signal for the quadrature channel to the sensor signal and the quadrature channel to determine a second phase value based on outputs of the incident channel and the quadrature channel; and
- determining the phase mismatch based on the first phase value and the second phase value.

15. The system of claim 14, the measurement circuit further configured to perform the calibration of the gain mismatch prior to performing the second calibration of the phase mismatch.

16. The system of claim 14, the measurement circuit further configured to perform a third calibration of an offset between the incident channel and the quadrature channel of the system, the third calibration comprising:
- for a plurality of points within the incident channel, shorting each such particular point in the incident channel to a corresponding particular point of the quadrature channel to determine based on outputs of the incident channel and the quadrature channel an offset between the incident channel and the quadrature channel existing from the particular point and the corresponding particular point to the outputs of the incident channel and the quadrature channel.

17. The system of claim 16, the measurement circuit further configured to perform the third calibration of the offset, followed by the calibration of the gain mismatch, then followed by the second calibration of the phase mismatch.

18. A method comprising, in a system including a resonant sensor configured to sense a physical quantity:
- measuring one or more resonance parameters associated with the resonant sensor and indicative of the physical quantity using an incident/quadrature detector having an incident channel and a quadrature channel; and performing a calibration of a non-ideality between the incident channel and the quadrature channel of the system, the calibration comprising:
  determining the non-ideality by controlling the sensor signal, an oscillation signal for the incident channel, and an oscillation signal for the quadrature channel; and
  correcting for the non-ideality;
  wherein the non-ideality comprises one of a gain mismatch, a phase mismatch, and an offset.

19. The method of claim 18, the calibration further comprising providing a known sensor signal to the inputs of the incident channel and the quadrature channel.

20. The method of claim 18, wherein the non-ideality comprises a phase mismatch and the calibration comprises:
  applying the oscillation signal for the incident channel to the sensor signal and the incident channel and applying the oscillation signal for the quadrature channel to the quadrature channel to determine a first phase value based on outputs of the incident channel and the quadrature channel;
  applying the oscillation signal for the incident channel to the incident channel and applying the oscillation signal for the quadrature channel to the sensor signal and the quadrature channel to determine a second phase value based on outputs of the incident channel and the quadrature channel; and
  determining the phase mismatch based on the first phase value and the second phase value.

21. The method of claim 18, wherein the non-ideality comprises an offset and the calibration comprises:
  for a plurality of points within the incident channel, shorting each such particular point in the incident channel to a corresponding particular point of the quadrature channel to determine based on outputs of the incident channel and the quadrature channel an offset between the incident channel and the quadrature channel existing from the particular point and the corresponding particular point to the outputs of the incident channel and the quadrature channel.

22. The method of claim 18, wherein the non-ideality comprises a phase mismatch and the calibration comprises:
  signal chopping at two pairs of corresponding points within the incident channel and the quadrature channel; and
  determining a measured phase of the system by averaging two consecutive samples of each of the outputs of the incidental channel and the quadrature channel such that a first of the two consecutive samples results from a lack of signal chopping within the incident channel and the quadrature channel and a second of the two consecutive samples results from signal chopping within the incident channel and the quadrature channel, such averaging correcting for the phase mismatch.

23. The method of claim 18, wherein the physical quantity is indicative of user interaction with a human-machine interface.

24. The method of claim 18, wherein the physical quantity is indicative of a displacement of a mechanical member relative to the resonant sensor.

25. The method of claim 18, wherein the non-ideality comprises a gain mismatch and the calibration comprises:
  applying the oscillation signal for the incident channel to the sensor signal, the incident channel, and the quadrature channel to determine a first gain correction factor based on outputs of the incident channel and the quadrature channel;
  applying the oscillation signal for the quadrature channel to the sensor signal, the incident channel, and the quadrature channel to determine a second gain correction factor based on outputs of the incident channel and the quadrature channel; and
  determining the gain mismatch based on the first gain correction factor and the second gain correction factor.

26. The method of claim 25, further comprising performing a second calibration of a phase mismatch between the incident channel and the quadrature channel of the system, the second calibration comprising:
  applying the oscillation signal for the incident channel to the sensor signal and the incident channel and applying the oscillation signal for the quadrature channel to the quadrature channel to determine a first phase value based on outputs of the incident channel and the quadrature channel;
  applying the oscillation signal for the incident channel to the incident channel and applying the oscillation signal for the quadrature channel to the sensor signal and the quadrature channel to determine a second phase value based on outputs of the incident channel and the quadrature channel; and
  determining the phase mismatch based on the first phase value and the second phase value.

27. The method of claim 26, further comprising performing the calibration of the gain mismatch prior to performing the second calibration of the phase mismatch.

28. The method of claim 26, further comprising performing a third calibration of an offset between the incident channel and the quadrature channel of the system, the third calibration comprising:
  for a plurality of points within the incident channel, shorting each such particular point in the incident channel to a corresponding particular point of the quadrature channel to determine based on outputs of the incident channel and the quadrature channel an offset between the incident channel and the quadrature channel existing from the particular point and the corresponding particular point to the outputs of the incident channel and the quadrature channel.

29. The method of claim 28, further comprising performing the third calibration of the offset, followed by the calibration of the gain mismatch, then followed by the second calibration of the phase mismatch.

30. The method of claim 18, further comprising determining the non-ideality by:
  controlling the sensor signal, the oscillation signal for the incident channel, and the oscillation signal for the quadrature channel using a pre-determined pattern of phase relationships among the sensor signal, the oscillation signal for the incident channel, and the oscillation signal for the quadrature channel;
  wherein the non-ideality is based on average measurements of the outputs of the incident channel and the quadrature channel among the pre-determined pattern of phase relationships.

31. The method of claim 30, wherein the non-ideality comprises one of offset error and flicker noise, and the pre-determined pattern of phase relationships includes phase differences of 0° and 180°.

32. The method of claim 30, wherein the non-ideality comprises harmonic mixing, and the pre-determined pattern of phase relationships includes phase differences of 0° and 45°.

33. The method of claim 30, wherein the non-ideality comprises gain mismatch, and the pre-determined pattern of phase relationships includes phase differences of 0°, 45°, 90°, and 135°.

34. The method of claim 30, wherein the non-ideality comprises a combination of non-idealities, and the pre-determined pattern of phase relationships includes phase differences of 0°, 45°, 90°, and 135°.

* * * * *